United States Patent [19]

Raab et al.

[11] Patent Number: 5,751,967
[45] Date of Patent: May 12, 1998

[54] METHOD AND APPARATUS FOR AUTOMATICALLY CONFIGURING A NETWORK DEVICE TO SUPPORT A VIRTUAL NETWORK

[75] Inventors: Ilan Raab, Sunnyvale; Ravi Manghirmalani, Fremont; Ofer Doitel, Saratoga; Lynne Marie Izbicki, Cupertino, all of Calif.

[73] Assignee: Bay Networks Group, Inc., Santa Clara, Calif.

[21] Appl. No.: 680,113

[22] Filed: Jul. 15, 1996

Related U.S. Application Data

[63] Continuation of Ser. No. 280,275, Jul. 25, 1994, abandoned.
[51] Int. Cl.$^6$ .......................... G06F 15/177; G06F 15/173
[52] U.S. Cl. ........................ 395/200.58; 395/200.5; 395/200.72
[58] Field of Search ............ 395/200.11, 200.1, 395/727, 375, 182.02, 200.54, 200.5, 200.72, 200.58

[56] References Cited

U.S. PATENT DOCUMENTS

| | | |
|---|---|---|
| 4,644,532 | 2/1987 | George et al. . |
| 4,827,411 | 5/1989 | Arrowood et al. ............ 395/600 |
| 4,991,204 | 2/1991 | Yamamoto et al. ............ 379/221 |
| 5,049,873 | 9/1991 | Robins et al. ............ 340/825.06 |
| 5,079,765 | 1/1992 | Nakamura ............ 370/85.13 |
| 5,088,091 | 2/1992 | Schroeder et al. ............ 370/94.3 |
| 5,101,348 | 3/1992 | Arrowood et al. ............ 395/200.11 |
| 5,247,381 | 9/1993 | Olmstead et al. ............ 359/118 |
| 5,261,044 | 11/1993 | Dev et al. . |
| 5,276,789 | 1/1994 | Besaw et al. ............ 395/146 |
| 5,295,244 | 3/1994 | Dev et al. . |
| 5,317,568 | 5/1994 | Bixby et al. . |
| 5,321,813 | 6/1994 | McMillen et al. ............ 395/182.09 |
| 5,436,909 | 7/1995 | Dev et al. . |
| 5,450,408 | 9/1995 | Phaal ............ 376/85.13 |
| 5,452,330 | 9/1995 | Goldstein ............ 375/257 |
| 5,504,921 | 4/1996 | Dev et al. . |

OTHER PUBLICATIONS

Newbridge Networks, Inc., *VIVID Yellow Ridge*, Pamphlet (1994).

*Primary Examiner*—Mark Hl. Rinehart
*Attorney, Agent, or Firm*—Blakely, Sokoloff, Taylor & Zafman

[57] ABSTRACT

A networking system and automatic method in a networking system comprising at least one switching device and a plurality of at least one end-station interconnected with the at least one switching device, wherein the at least one switching device and at least one end-station are interconnected in a topology. A configuration device is included which has a configuration modification detection circuit for detecting the modification of the topology. A configuration policy maintenance circuit is provided for storing policies related to reconfiguring the at least one switching device upon the modification of the topology. A policy evaluation circuit is provided for determining which at least one end-station and ports should be grouped together upon the detection of the modification of the topology in a first manner. A reconfiguration circuit is provided for reconfiguring the at least one switching device in the first network to enable at least one end-station and ports to be grouped together in the first manner. Virtual local area networks may be created/extended/deleted during the reconfiguration to provide networking services to the at least one end-station.

61 Claims, 19 Drawing Sheets

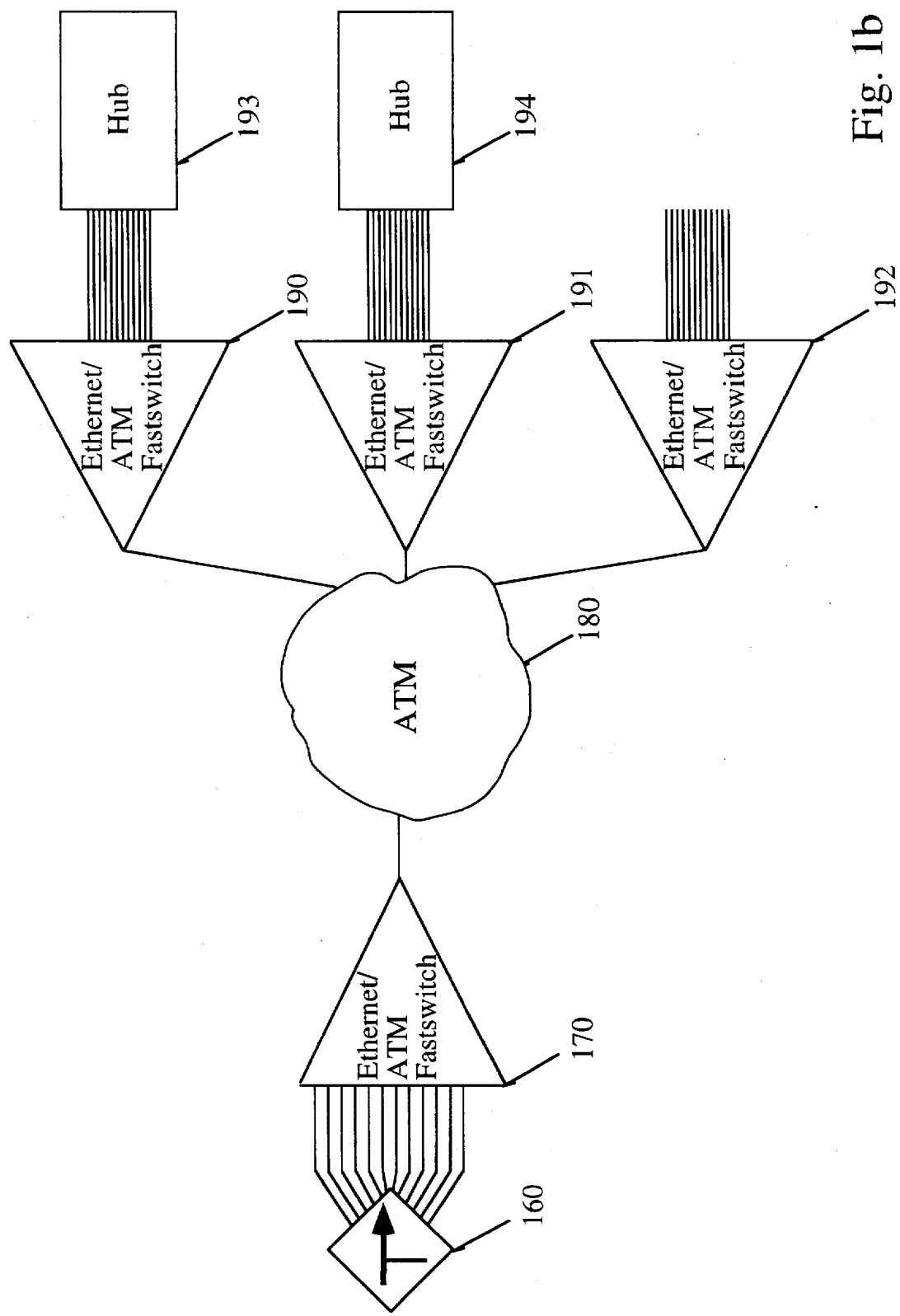

| Domain Index 701 | Policy # 702 | Member Type 703 | Member Identifier 704 | Member Mask 705 | Allow/ Disallow 706 | Priority 707 |
|---|---|---|---|---|---|---|
| 1 | 1 | MAC_ADDRESS | 000081010101 | ffffffffffff | Allow | |
| 1 | 1 | MAC_ADDRESS | 000081020202 | ffffffffffff | Allow | |
| 1 | 1 | ATM_ADDRESS | 00000000000000000000<br>0000000081030303000 | ffffffffffffffff<br>ffffffffffff | Allow | |
| 1 | 2 | IP_ADDRESS | 134.177.120.0 | ffffff00 | Allow | |
| 1 | 2 | VLAN_PORT | 134.177.130.1/5/10 | | Allow | |

| Domain Index | Member Type | Member Identifier | Member Mask |
|---|---|---|---|
| 1 | MAC_ADDRESS | 000081AAAAAA | ffffffffffff |
| 1 | MAC_ADDRESS | 000081BBBBBB | ffffffffffff |
| 2 | VLAN_PORT | 134.177.140.10/1/1 | 0 |

Fig. 8

| Domain Index | Auto-Policy Type | Policy Arguments | Priority |
|---|---|---|---|

Fig. 9

VAC Main Loop

1100

Configuration Polling
1104

Policy Evaluation

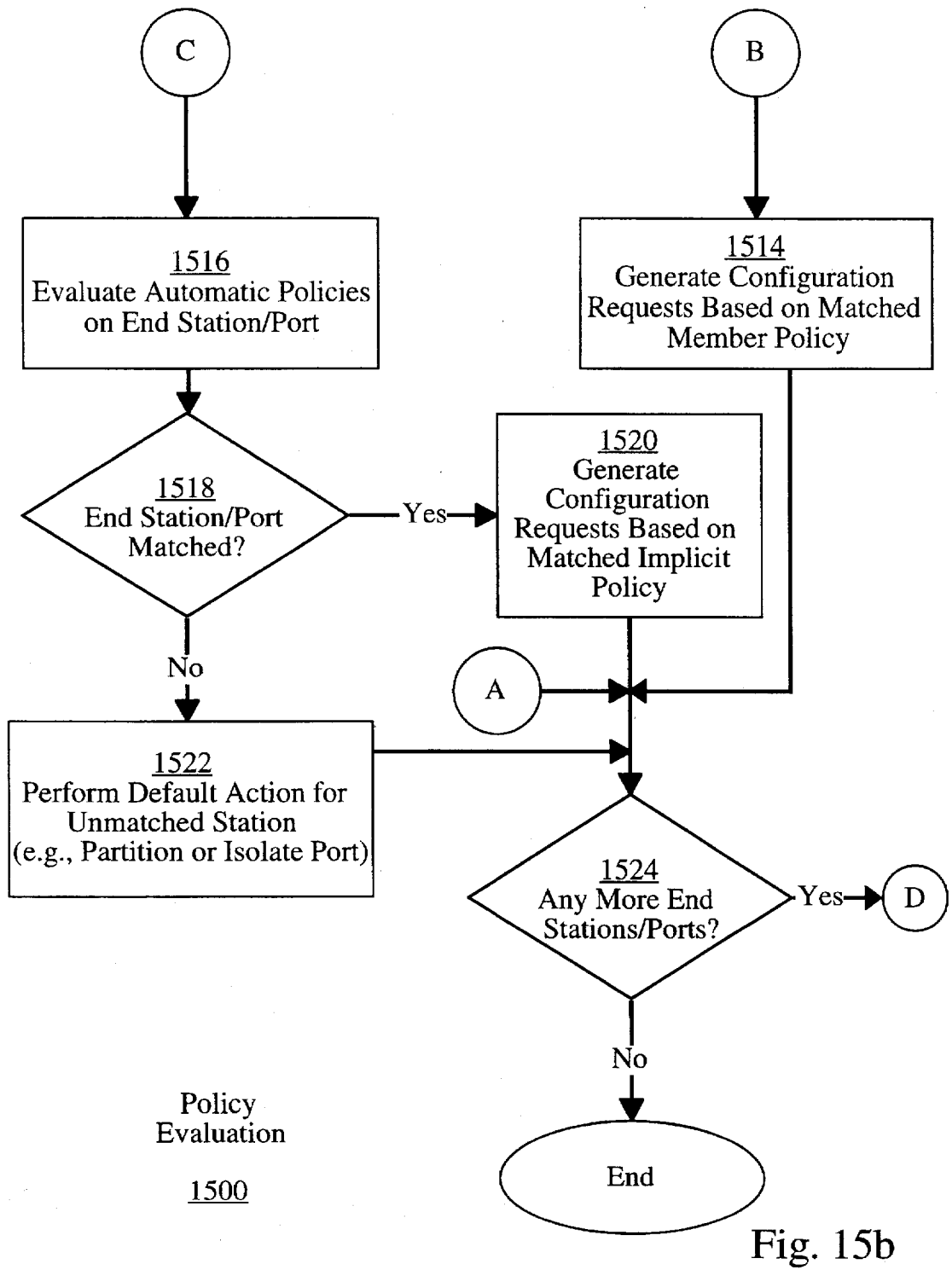

VLAN Creation/Addition

1600

METHOD AND APPARATUS FOR AUTOMATICALLY CONFIGURING A NETWORK DEVICE TO SUPPORT A VIRTUAL NETWORK

This is a continuation of application Ser. No. 08/280,275, filed Jul. 25, 1994, abandoned.

BACKGROUND OF THE INVENTION

1. Field of the Invention

The present invention relates to networking systems. More specifically, the present invention relates to an automatic method of re-configuring hubs, switches and end-stations in a switched networking system in order to allow automatic virtual local area network (VLAN) management.

2. Background Information

Due to the proliferation of local area networks (LAN's), needs have developed for more powerful tools to manage such LAN's as they increase in complexity and size. One technique used in networking systems for managing very large networks is known as the virtual local area network (VLAN), which allows collections of end-user devices to directly communicate with one another. A VLAN is a logical network wherein the end-user devices in the network can directly communicate with one another without traversing an inter-networking device. Each of the devices in a VLAN can receive each other's multicast traffic. VLANs typically can comprise a number of logical domains overlaid on a physical network. Thus, VLANs provide the capability to provide certain networking resources to end-stations in the VLAN, even though the end-stations are widely distributed in a switched network.

Because of the size and complexity of some switched networks, especially those in which VLANs may be implemented, management of VLANs becomes an increasingly complex management task. For example, using present technology, devices in the network must be independently configured in order for widely distributed devices to operate as a single VLAN. As the number of VLANs in a switched network increases, the task of configuring and maintaining the network to retain certain end-stations as members of certain VLANs becomes an almost insurmountable process for a network manager. For example, as stations are added, moved or removed in the physical network, network devices need to be reconfigured in such a way that network services (connectivity) are provided to the end-station without disruption. Using manual prior art techniques, in networks having large numbers of nodes, this is very burdensome and time consuming.

Prior art methods of VLAN configuration primarily involve manual reconfiguration by a network manager of VLANs by the reconfiguration of the existing network hardware. Thus, as nodes are added, removed or moved, devices in the network fabric have to be manually reconfigured in order to reconfigure the network appropriately. This poses substantial scalability, time and cost problems for network managers and overall network maintenance. In addition, prior art means for reconfiguration do not address the problems associated with very large systems spanning across different technologies (e.g., those incorporating cell-switched, frame-switched and configuration switched devices).

Thus, the prior art of network configuration, especially in those implementing virtual local area networks, have several deficiencies.

SUMMARY AND OBJECTS OF THE PRESENT INVENTION

One of the objects of the present invention is to provide an improved method for configuring virtual local area networks.

Another of the objects of the present invention is to provide an automated tool for updating the network fabric in a system where devices may move, be added/removed or characteristics of the network may otherwise be changed.

Yet another of the objects of the present invention is to provide an improved means for maintaining the configuration of a network, including additions/removals and movement of end-stations for virtual local area networks (VLANs) in a switched networking system incorporating a variety of switching devices (e.g., cell-switched, frame-switched and configuration-switched devices).

These and other objects of the present invention are provided for by a networking system and automatic method in a networking system comprising a plurality of switching devices and a plurality of end-stations interconnected with the switching devices, wherein the switching devices and end-stations are interconnected in a first topology. A configuration device is included which has a configuration modification detection circuit for detecting the modification of the first topology. A configuration policy maintenance circuit is provided for storing policies related to reconfiguring the switching devices upon the modification of the first topology. Further, a policy evaluation circuit is provided for determining which end-stations and ports should be grouped together in a first manner. Lastly, a reconfiguration circuit is provided for reconfiguring the switching devices in the network to enable end-stations and ports to be grouped in the first manner.

In implemented embodiments, the reconfiguring includes assigning newly-coupled end-stations in the networking system to virtual networks according to the policies. This process includes reconfiguring the switching devices to interconnect the end-stations and to assign the end-stations to the virtual local area networks (VLANs). The configuration modification detection circuit is implemented in one embodiment as a polling circuit for polling the switching devices in the network to determine the modification of the first topology. In another embodiment, it is implemented via traps wherein a trap reception circuit is provided for receiving traps generated by the switching devices in the network upon the modification of the first topology. Modification of the first topology may include a first end-station being removed from the network, being moved in the network, or being added to the network. Modification of the first topology may also include modification of interconnections between switching devices. If an end-station moves, network services formerly provided to the end-station may be automatically provided at its new location via the automatic reconfiguration of effected network switching devices. Predetermined network services may be made available to a new station via automatic reconfiguration of networking switching devices connected to the new station and deletion of VLAN's from effected network switching devices may be performed upon removal of end-stations.

In implemented embodiments, the policies include a member policy table specifying which end-stations should or should not be coupled together to form virtual networks. Policies may also include an override policy table specifying that certain of the end-stations should not be reconfigured. For certain policies, end-stations may be specified using certain attributes such as hardware (e.g. MAC), asynchronous transfer mode (ATM), or network address (e.g. internet protocol [IP] or IPX address), or specified ports which should be grouped together to form a VLAN. Any other attributes which may be obtained from end-stations may be used for defining policies. The policies may also include an automatic policy table specifying that VLANs should be created automatically for end-stations having certain common attributes (e.g. in the same subnet). Such policies may be defined and maintained by a user (e.g. a network manager) at a network management station for automatic implementation during network operation.

Other objects, features and advantages of the present invention will be apparent from the accompanying description and figures which follow below.

BRIEF DESCRIPTION OF THE DRAWINGS

The present invention is illustrated by way of example and not limitation in the figures of the accompanying in which like references indicate like elements and in which:

FIGS. 1a and 1b illustrate block diagrams of switched inter-networks in which embodiments of the present invention may be implemented.

FIGS. 5–10 show various tables which are maintained for automatic configuration of virtual local area networks in a switched networking system.

FIGS. 15a–15b show a flowchart of the policy evaluation process.

DETAILED DESCRIPTION

Implemented embodiments of the present invention include methods and apparatus for automatic configuration of switched networks implementing virtual local area networks (VLANs). For the remainder of this application, as will be discussed, reference will be made to certain networking devices such as "concentrators" or "hubs" which have a plurality of plug-in modules which each have ports for connecting to different types of network cables such as fiber optic cable, unshielded twisted pair cable and shielded twisted pair cable. Reference is specifically made to U.S. Pat. No. 5,226,120 of Brown et al., (hereinafter "Brown") issued on Jul. 6, 1993, which shows in detail certain hardware structures for implementing such devices as "concentrators" and/or "hubs." The techniques to be described here are implemented in a software implementation in central processing unit(s) of device(s) in a switched networking system such as described in Brown. Although the present invention will primarily be directed towards a method which is implemented in a software code implementation which is executed at run-time in a single device and which interacts with software for communication in other networking devices, it can be appreciated by one skilled in the art that these may be implemented in any variety of dedicated hardware devices in a networking device including, but not limited to, discrete logic circuits, large scale integrated circuits (VLSI's) or application-specific integrated circuits (ASIC's) which may be coupled to a network.

Figure 1A:
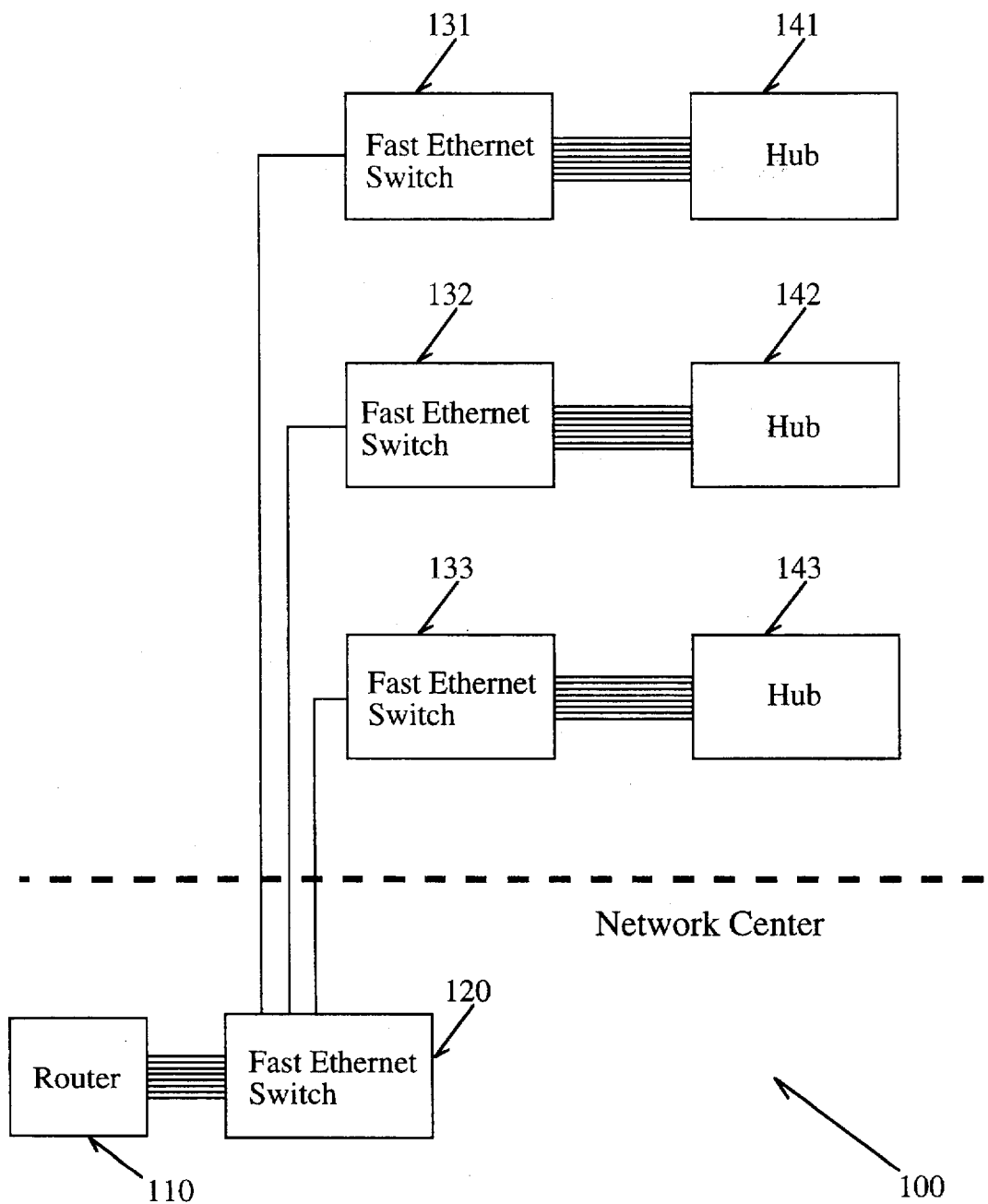

An example of a switched networking system in which implementations of the present invention may be useful is illustrated as system 100 in FIG. 1a. Such a system may span a variety of technologies, for example, those employing either configuration-switched, frame-switched or cell-switched devices which support the creation of VLANs. For example, in the configuration illustrated as system 100 in FIG. 1a, a routing device 110 may be used for routing appropriate signals to the remainder of network 100 via receipt and forwarding of appropriate packets to the fast Ethernet switch 120, a frame switching device. Fast Ethernet switch 120 may be any number of commercially available fast Ethernet switches which support the creation of VLANs and which are available from various manufacturers, such as those conforming to IEEE standard 802.13 or 802.14. An example of such a device is the LattisSwitch 28000 brand series of fast Ethernet switches available from SynOptics Communications, Inc. of Santa Clara, Calif. Such a device may be coupled to a second set of fast Ethernet switches 131–133 for forwarding to appropriate end-stations or hubs in the switched networking fabric.

In the illustrated example, each of the fast Ethernet switches 131–133 may be coupled to a plurality of hubs or "concentrators" which provide configuration switching capability and which are coupled to end-stations or other concentrators or hubs in the networking fabric. A configuration-switched device is one which requires reconfiguration of physical switches in the devices onto physical channels to provide communication, say, between a first physical port and a second physical port. Typically, the number of communication channels or backplanes is such a device is finite. In addition, communication in such a device between ports within a single host module may be implemented by using a local channel in the host module. If all the members of a VLAN between which connectivity is desired to be established reside in the same cluster, then the cluster may be isolated to form the VLAN within the device. Of course, in other implementations of configuration-switched devices, other modes of re-configuring the device(s) may be used. Also, a single level of hubs 141–143 is shown in the illustration, this is an example only and other configurations and/or topologies of switched networks may be used in implementations of the present invention.

In another implementation, such as that implementing an asynchronous transfer mode (ATM) environment, the SynOptics LattisCell brand cell-switching device may be used. An example of a switched inter-network using ATM devices in which implemented embodiments may be active is shown as 150 of FIG. 1b. As with system 100 in FIG. 1a, inter-network 150 may receive signals for transmission to nodes in the network via a router 160. Router 160 may be coupled to a device 170 which converts frame-switched signals to cell switched signals. Device 170 is then coupled to an asynchronous transfer mode (ATM) network 180. This may include a plurality of ATM switches. In addition, the ATM network 180 may further be coupled to a plurality of Ethernet/ATM fast switches 190–192 for coupling to additional hubs and/or end-stations which conform to Ethernet standards. Thus, the cell-switched signals received from ATM community 180 will then be converted by devices 190–192 back into the frame-switched messages. These frame-switched messages can then be transmitted to other devices in the network such as configuration switches 193 or 194 or end-stations. It can be appreciated by one skilled in the art that FIGS. 1a and 1b are example switched networks shown for illustration purposes only, and any topology of networks employing a variety of technologies capable of supporting VLANs may be used for implementing the processes to be described here.

Figure 2:
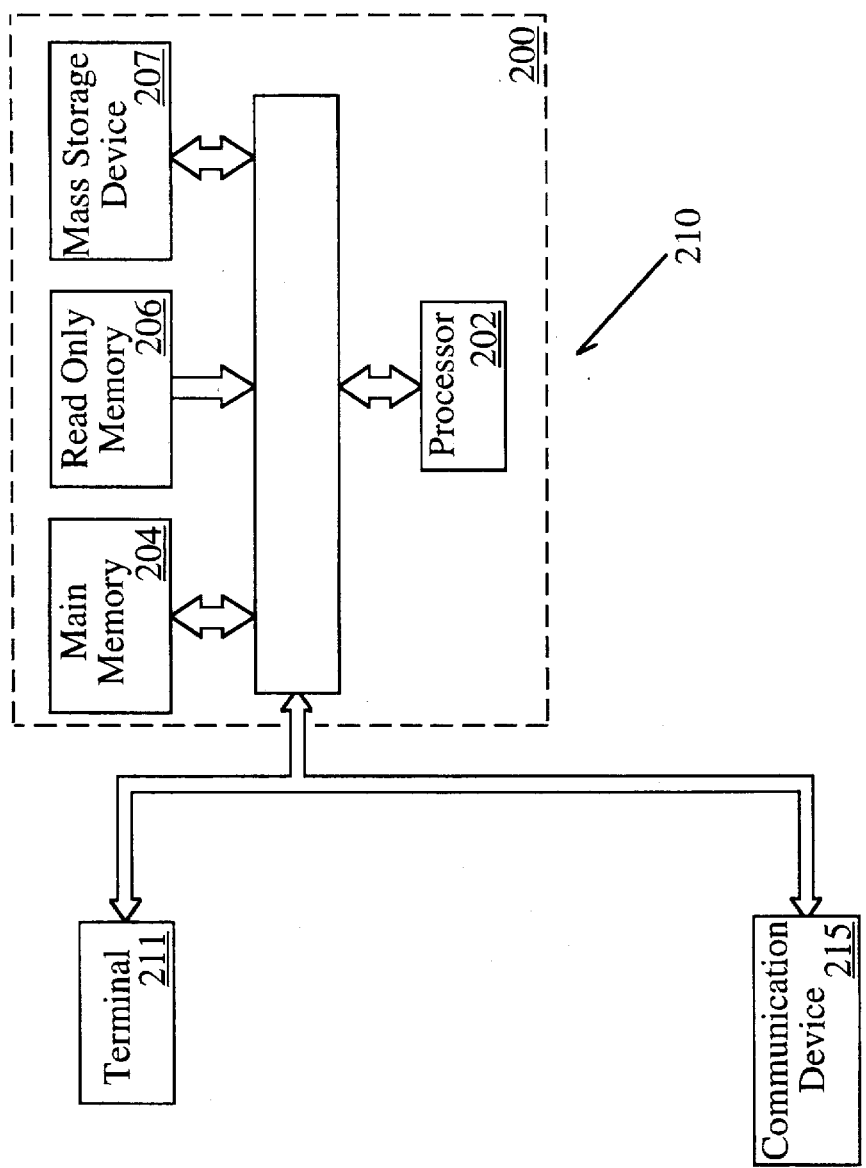
FIG. 2 shows a block diagram of a network device in which certain of the processes of the present invention may be implemented.

Referring to FIG. 2, a system upon which one embodiment of a networking device (e.g., a network control engine [NCE]) which may be used for implementing the processes to be described here illustrated as 210 in FIG. 2. System 210 comprises a bus or other communication means 201 for communicating information, and a processing means 202 (e.g., a microprocessor) coupled with bus 201 for processing information. System 210 further comprises a random access memory (RAM) or other volatile storage device 204 (referred to as main memory), coupled to bus 201 for storing information and instructions to be executed by processor 202. Main memory 204 also may be used for storing temporary variables or other intermediate information during execution of instructions by processor 202. System 210 also comprises a read only memory (ROM) and/or other static storage device 206 coupled to bus 201 for storing static information and instructions for processor 202, and a data storage device 207 such as a magnetic disk or optical disk and its corresponding disk drive. Data storage device 207 is coupled to bus 201 for storing information and instructions. System 210 may further be coupled to a console 211, such as a cathode ray tube (CRT) or liquid crystal display (LCD) or teletype coupled to bus 201 for displaying information to a computer user.

In the implemented embodiments, another device which is coupled to bus 201 is a communication device 215 which is a means for communicating with other devices. This communication device includes a means for communicating with other nodes in the network. In certain implemented embodiments, this includes an Ethernet standard interface coupled to a CSMA/CD backplane for communicating network information with other devices in a switched networking system. Note, also, that any or all of the components of device 210 and associated hardware may be used in various embodiments, however, it can be appreciated that any configuration of the system that includes a processor 202 and a communication device 215 may be used for various purposes according to the particular implementation.

Virtual Auto-Configuration

Figure 3:
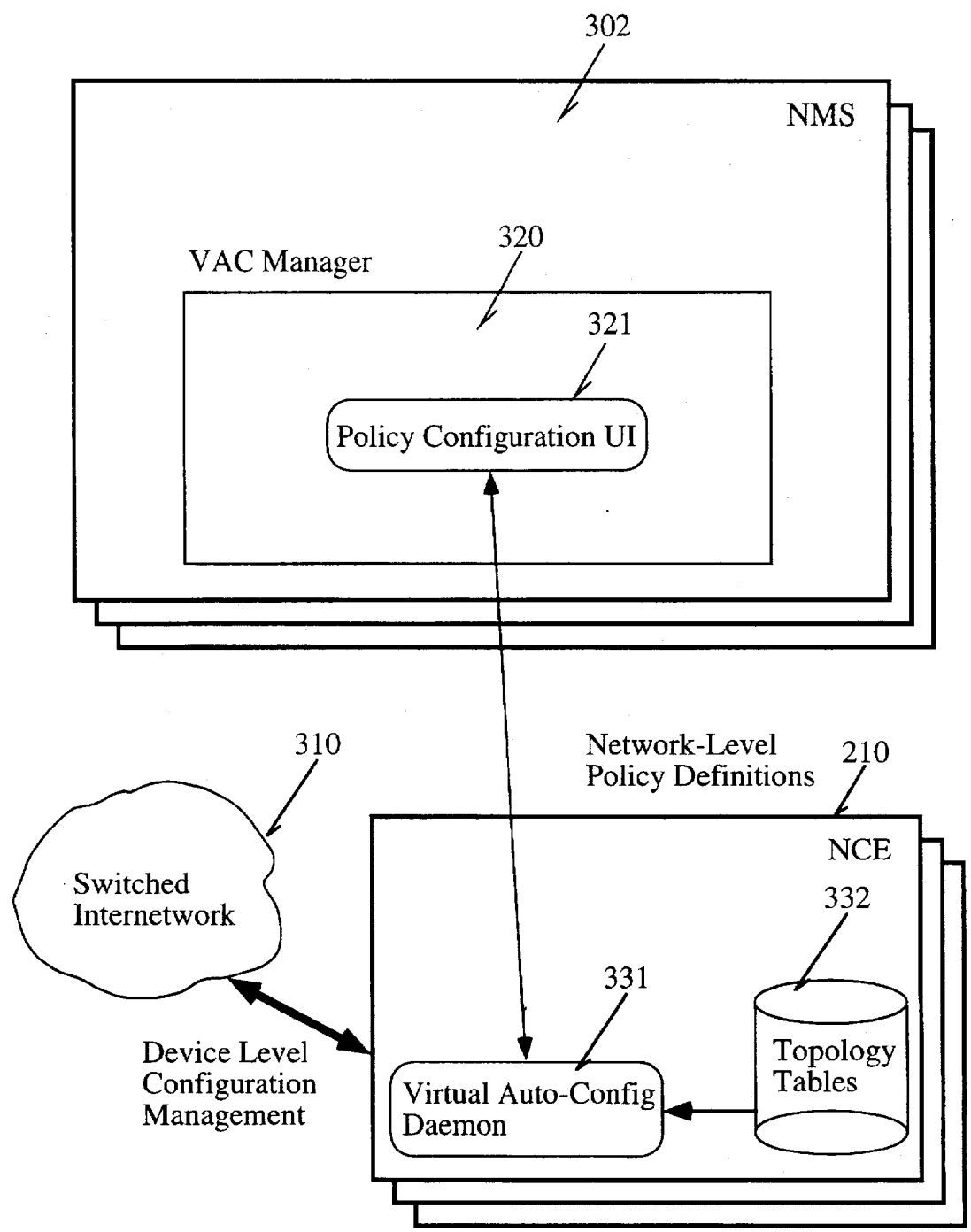
FIG. 3 shows a block diagram of processes which are active in implemented embodiments of the present invention.

Virtual auto-configuration (VAC) is a management tool implemented as a series of executable routines which are operative within a single device (e.g., NCE 200) in a switched networking system. Active within the device is a process known as the virtual auto-configuration daemon (VAC daemon) process 331 which is responsible for managing all the VLAN devices in the switched inter-network 310 via communication with software processes resident in those devices. This is described with reference to FIG. 3. Virtual auto-configuration manager 320 interacts with daemon process 331 wherein the network manager may set up various virtual local area networks in the switched inter-network by defining "policies" within manager process 320. Policies are broadly defined as rules which specify how end-stations within the switched network should be grouped into VLANs. Policies are maintained using a policy configuration user interface 321 which is resident within VAC manager 320.

For example, a network manager may specify that all end-stations having predetermined media access control (MAC) addresses within a specified range are members of the same VLAN. Other policies may be defined based on any polled network data which will be illustrated with reference to the policy tables which follow below. Policies may be defined in any number of ways including, but not limited to, the use of a graphical user interface (GUI) using well-known techniques for creating tables with values/strings and other data items for populating tables specifying the policies. Via communication with the VAC daemon process 331, a network management station may also present a graphical display to the network manager of the virtual networks in the system 340. This may be done using any number of prior art techniques, for example, a text list mapping VLANs to names or a graphical user interface displaying the physical configuration of the network (topology) and end-stations.

VAC daemon process 331 is a process which provides the automatic VLAN configuration which is to be described here. The process maintains a datastore of network configuration policy information as specified by the VAC manager process 320. It also monitors the configuration of the network, via examination of topology tables 332, and determines physical connectivity of VLAN devices such as the devices illustrated in FIGS. 1a and 1b. It determines, via polling of devices or via device-generated traps when physical (VLAN device connectivity) and end-station connectivity (end-stations are added, moved or removed) changes in the networking system. It also detects changes to configured policies as specified by the VAC manager 320 (e.g, a process for defining policies operative within a network management station 302), and updates the devices in the switched inter-network 310 accordingly for maintenance/creation/deletion of VLANs. The VAC daemon process 331 will evaluate the policies, and as new stations are added, moved or removed, and evaluate the policies to determine how the network fabric should be reconfigured, and reconfigure devices appropriately.

Certain capabilities are provided by VAC daemon process 331. One is broadly known as "auto-configuration" which is the ability to detect when a new station has been connected to an existing network and configure network devices so that it becomes a member of an appropriate VLAN. The new end-station will be identified and, using the predefined policies, it will be determined which VLAN to assign the station to. Once an association has been identified, VAC daemon 331 will program the appropriate device(s) so that the end-station will be added to the correct VLAN.

Another capability which is provided by the VAC daemon process 331 is known as "auto-roaming." Auto-roaming detects when an end-station which was previously connected to a first device within the network is physically moved to a another location in the network such as a second device or port. As with auto-configuration, VAC programs the appropriate device(s) so that the same network connectivity is restored to the end-station. In implemented embodiments of the present invention, movement of end-stations may occur across different technologies, be they cell-switched devices (ATM), frame-switched devices (fast Ethernet switches) or configuration-switched devices (hubs and/or concentrators).

Figure 4:
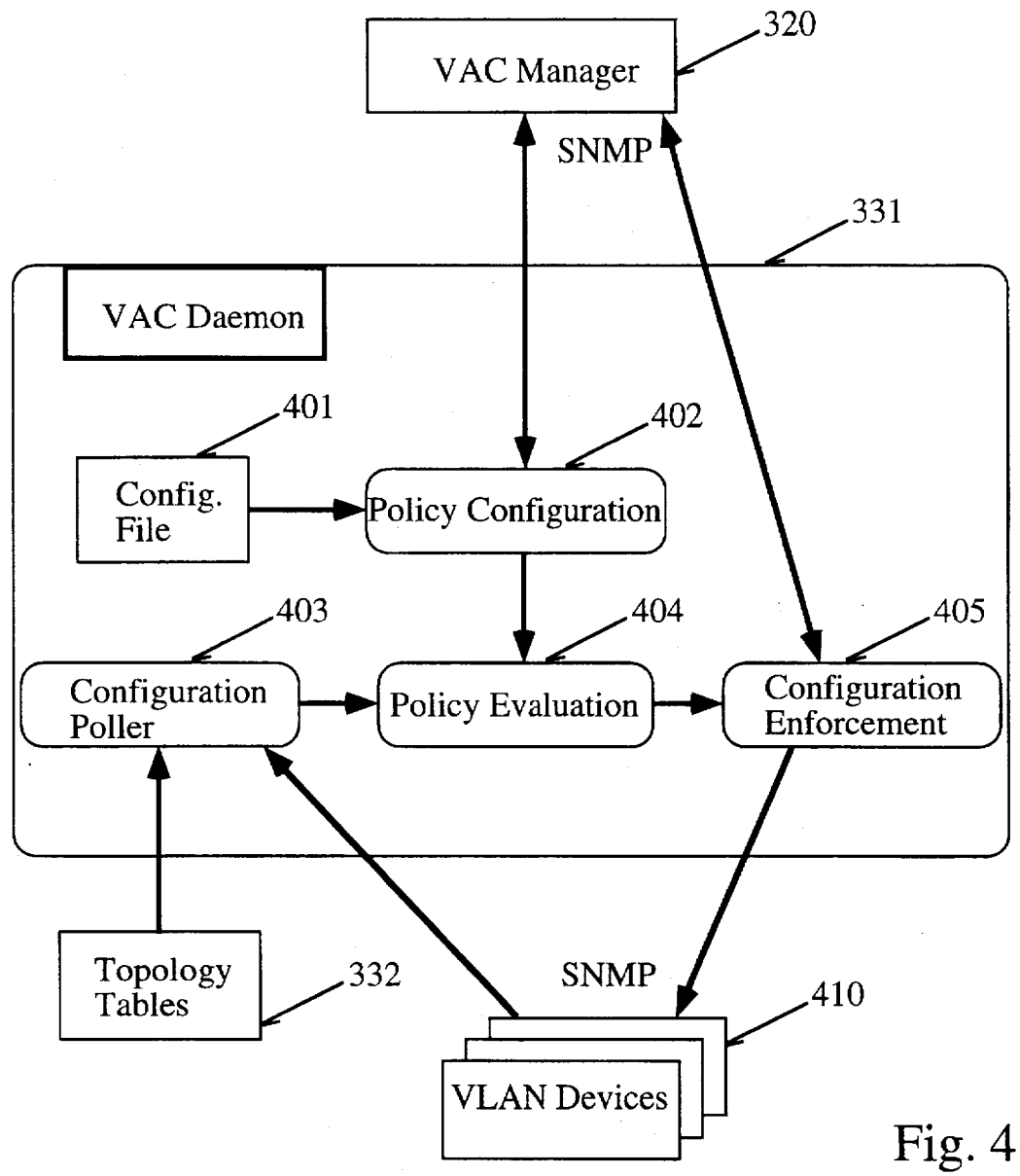
FIG. 4 shows a block diagram of various processes active in an auto-configuration process.

FIG. 4 illustrates the communication between processes in a networking system and a more detailed view of the VAC daemon process 331. VAC daemon process 331 operates by periodically checking the network for any devices which require reconfiguration, and reconfiguring device(s) in the network necessary to meet the policies which have been specified by VAC manager 320. Moreover, end-station movement, addition or removal may be determined by polling network devices, in one embodiment of the present invention, or by the generation of traps by the devices to which the end-station(s) are connected. Communication provided between the VAC daemon process 331 and the VAC manager is performed using Simple Network Management Protocol (SNMP) exchanges wherein policies are maintained in policy configuration tables in a configuration file 401 by a policy configuration module 402. The configuration poller 403 periodically polls VLAN devices 410 (via communication with processes residing in the devices) in the switched inter-network in order to determine end-stations which have been added, moved or removed. In addition, configuration poller 403 references topology tables 332 which specify the physical topology of the switched inter-network. Topology tables 332 may be maintained in any of a variety of ways, including manual maintenance of the topology of the network by a network manager or an automatic topology determination process. Although virtual auto-configuration may be implemented using manual topology maintenance, the present invention is particularly useful in a system which is fully automatic—automatically determining topology (changes in connectivity between network devices), and automatically reconfiguring the device(s) based on predefined policies according to changes in topology or changes in the connectivity of end-stations.

In an alternative technique, configuration poller 403 may be implemented as a process which receives traps from VLAN devices 410 when changes of connectivity of end-stations or of topology occur. In the instance of a trap-driven architecture, network traffic will be reduced because only information which changes the previous configuration of the network will then be received by poller 403. Changes in the network will also be detected faster. In either event, configuration poller 403 detects end-stations which have been added, moved or removed and generates a list of end-stations requiring evaluation. This list of end-stations is then passed to a policy evaluation module 404 which processes each of the end-stations or ports in the list and determines which device(s) need to be reconfigured in the network, according to the policies received from the policy configuration process 402. Policy evaluation process 404 then generates a series of high-level commands for creation of a new VLAN, deletion of an existing VLAN, or addition or deletion of ports/end-stations to a pre-existing VLAN, and the corresponding network device(s). This list of high level commands is passed to configuration enforcement module 405 to perform the reconfiguration to the VLAN device(s) 410 in the network.

For the remainder of this application, several types of devices may be used in switched inter-networks in implemented embodiments in order to provide connectivity between end-stations: configuration-switched devices (e.g., the SynOptics 5000-series brand concentrator available from SynOptics Communications, Inc. of Santa Clara, Calif.); frame-switched devices (e.g., the SynOptics LattisSwitch 28000-series brand fast Ethernet switch); and cell-switched devices (e.g., the SynOptics LattisCell ATM [Asynchronous Transfer Mode] brand switch). Other devices may be configured, including those which provide cross-technology connectivity, such as the EtherCell brand cross technology switch device available from SynOptics, which provides connectivity between Ethernet and cell-switched (e.g., ATM) devices and vice-versa. In certain configuration-switched devices, a plurality of physical backplanes is provided which may be used to create VLANs. In other words, specified slot/port combinations may be configured to be connected to a specified backplane in order to create a VLAN between host modules within the device. Alternative ways of configuring VLANs within configuration-switched devices include creating the VLAN within a local channel in a single host module, if all end-stations and/or interconnected devices in the VLAN are connected to the same host module. In other implementations, if all interconnected ports and/or end-stations are in a single cluster, the cluster may be isolated to form the VLAN within the device.

In both the cell-switched and frame-switched devices, a large number of VLANs may be created. In these devices, connectivity is implemented primarily in software, allowing signals to be transmitted between ports in any variety of ways and which are not limited by the physical backplane constraints of configuration-switched devices. In these devices, changes to internally-stored tables contained within the devices via SNMP is one way in which changes of connectivity in these devices are detected. The devices may also be reconfigured via SNMP exchanges to change VLANs defined by the internally-stored tables. For the remainder of this application, configuration-switched devices are described in detail here, however, modifications to these processes here may be required for other devices in a switched inter-network including via SNMP exchanges to detect, create and delete VLANs for VLAN devices.

Policy configuration module 402 maintains policy tables which are used for determining VLAN configuration for end-stations in the switched inter-network. Initial policy definitions are read from the configuration file 401 at system start-up, and the policies may be modified and retrieved via SNMP exchanges by VAC manager 320. At any time that policy configurations are modified, configuration process 402 will update the changes to the configuration file 401 and the policy tables contained therein. Also, any end-stations which may be effected by the change in policies will be re-evaluated. Three policy tables are maintained by policy configuration module 402 during operation of VAC daemon 331: a Member Policy Table; an Automatic Policy Table; and an Override Policy Table. These tables will now be discussed.

Member Policy Table

The member policy table provides a method for the network manager to explicitly specify the VLAN membership of specified end-stations by MAC address, ATM address, network address, (e.g., internet protocol [IP], or IPX address) including the use of wildcards in conjunction with such addresses or VLAN port. An example of the fields contained within the Member Policy Table is illustrated with reference to table 500 of FIG. 5. The domain index field 501 is for specifying the set of VLAN devices across which VLAN(s) can be configured. This is known as the configuration domain, and is referenced by a unique integer known as a domain index. Policy number field 502 is an integer value which represents a grouping of VLAN members. In member policy table 500, each unique policy number maps to a unique VLAN.

Figures 5, 6:
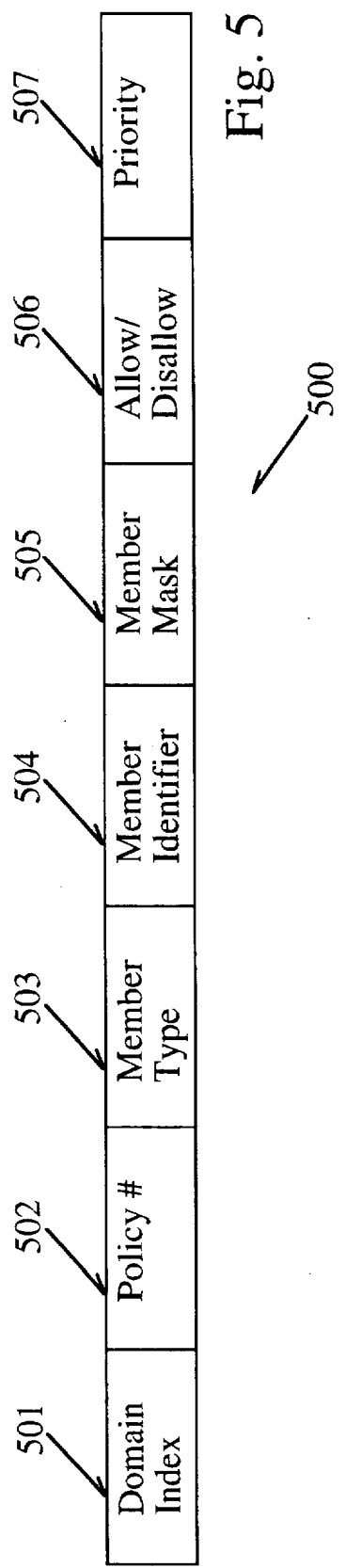

The member type field 503, the member identifier field 504 and the member mask field 505 are shown in more detail in FIG. 6. The member type field 503 is an enumeration of how the member is specified. Thus, an integer value indicating either MAC address, ATM address, IP address, VLAN port or ATM port may be specified in the member type field 503. Additional end-station attributes via the use of additional integer value(s) may be specified as they are defined. In the case of the member type field 503 indicating that the member identifier is a MAC address, then the member identifier field 504 contains a 6-byte MAC address. As indicated by entry 602, if the address is an ATM address, then the member identifier field contains a 20-byte ATM address. The remaining definitions for each of the fields are shown in elements 603–605 in FIG. 6. Along with each member identifier is a member mask field 505 which is used for providing wildcarding capabilities (such as all MAC's with a certain prefix, or all IP addresses on a certain subnet). When a bit in the member mask field 505 is set, it indicates that the policy evaluation process should use this bit in the comparison of the end-station attribute. Like the member identifier, its format depends upon the member type. Although five types of identification for policies have been illustrated here, other information for identifying end-stations may be used for defining policies such as end-station names, zones or other information including the use of wildcards.

The next field shown in FIG. 5 is an "allow/disallow" field 506. This field specifies whether members matching this policy are allowed in the same VLAN as other members specified by the policy. Note that end-stations which have no entry in the table for a given policy are automatically disallowed. Allow/disallow field 506 may be an integer value (or a bit) having two possible integer values: a first value indicating that the member should be allowed as a member of the VLAN; and a second value indicating that it should not be a member of the VLAN.

Finally, the last field illustrated in 500 is the priority field 507. This is an integer value indicating the order in which policy entries within the table are evaluated by the policy evaluation process. This is used because there is a possibility that conflicting definitions may be present in the tables. Thus, policies are evaluated in highest priority (e.g., lowest integer value) to lowest priority (e.g., highest integer value) order, and once a policy has been determined which matches the member, then subsequent policies are not evaluated.

An example of policies specified in a table having a format illustrated as 500 is shown as 700 of FIG. 7. For example, entries 711–713 specify policy number 1 which specifies a first VLAN. Entries 714 and 715 specify a second VLAN. As illustrated in entries 711–713, all the bits in member mask fields 705 are set, and thus all of the bits in the member identifier fields 704 for these entries are used during the comparison for determining whether the policies match the end station or not. The first two entries, 711 and 712, specify a MAC address-based policy and the third entry uses an ATM address-based policy. The second VLAN specified by entries 714 and 715 show an example of strapping a particular VLAN port into a specific VLAN. Specifically, all stations which are on IP subnet 134.177.120.0, and any station plugged into slot 5, port 10 on the specified device (having the IP address 134.177.130.1) will be on the same VLAN. Note that the mask field 705 for entry 714 specifies that the bits contained in the last two bytes of the IP address should not be used during the comparison. In other words, the least significant portion of the address is not used during the comparison for matching the address to this policy.

Override Policy Table

The override policy table enables the network manager to prevent automatic configuration of specified end-stations and VLAN ports by VAC daemon process 331. The table is used to bypass automatic configuration. In one instance, the network manager may manually configure the device(s) for the end-station. VAC daemon 331 will not attempt to configure network devices for any end-stations which match any of the entries in the override policy table. An example of an override policy table is shown as 800 in FIG. 8.

Override policy table 800 contains four fields: domain index 801; member type 802; member identifier 803; and member mask 804. These fields have meanings similar to those specified in the member policy table discussed above, however, the specified override policies indicate that the VAC daemon should not reconfigure the device(s) in the network for the matching end-stations. As shown in the example table 800 of FIG. 8, in domain number 1, no matter where the end-stations having the MAC addresses specified in field 803 of entries 810 and 811 show up, reconfiguration of devices for these stations should not be attempted. In effect, this turns off the "auto-roaming" features of these stations allowing any manual or default configuration to remain. In domain number 2 as specified by entry 812, the VAC should never attempt to reconfigure the VLAN slot 1, port 1 on the specified VLAN device identified by the IP address in field 803, regardless of the end-station plugged into the port.

Automatic Policy Table

Figure 10:
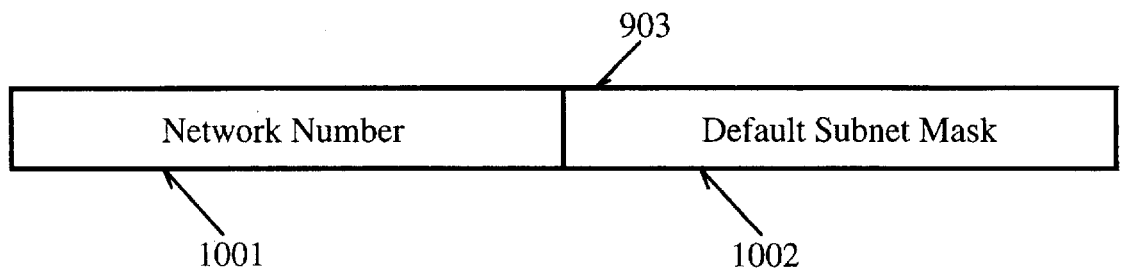

The last table used by the policy configuration and policy evaluation modules in the VAC daemon process 331 is the automatic policy table. The format of the fields specified in the automatic policy table is shown as 900 in FIG. 9. Table 900 includes a domain index field 901 and a priority field 904, which have the same definitions as specified with respect to the member policy table. Automatic policy table 900 also includes an auto policy type field 902 and a policy arguments field 903. The auto policy type field is an enumerated value indicating the type of policy. The arguments specified in field 903 are dependent upon the auto policy type. In implemented embodiments of the present invention, the auto policy type is specified using an internet protocol (IP) address wherein the policy arguments are an 8-byte value indicating the IP network number in field 1001 and the subnet mask to be used on the network in field 1002. This is shown in FIG. 10. VAC daemon process 331 creates a separate VLAN for each IP subnet it detects, and places all the members of that IP subnet into the correct VLAN. In other words, instead of defining separate policies for each subnet, automatic policies allow the creation of separate VLANs for each unique subnet detected. In other implementations, other information about specified end-station(s) can be used to specify automatic policies such as those illustrated in FIG. 10. As with other policies, any other information about end-stations which may be obtained may be used for automatic policies.

Flow of Control Within the VAC Daemon

Figure 11:
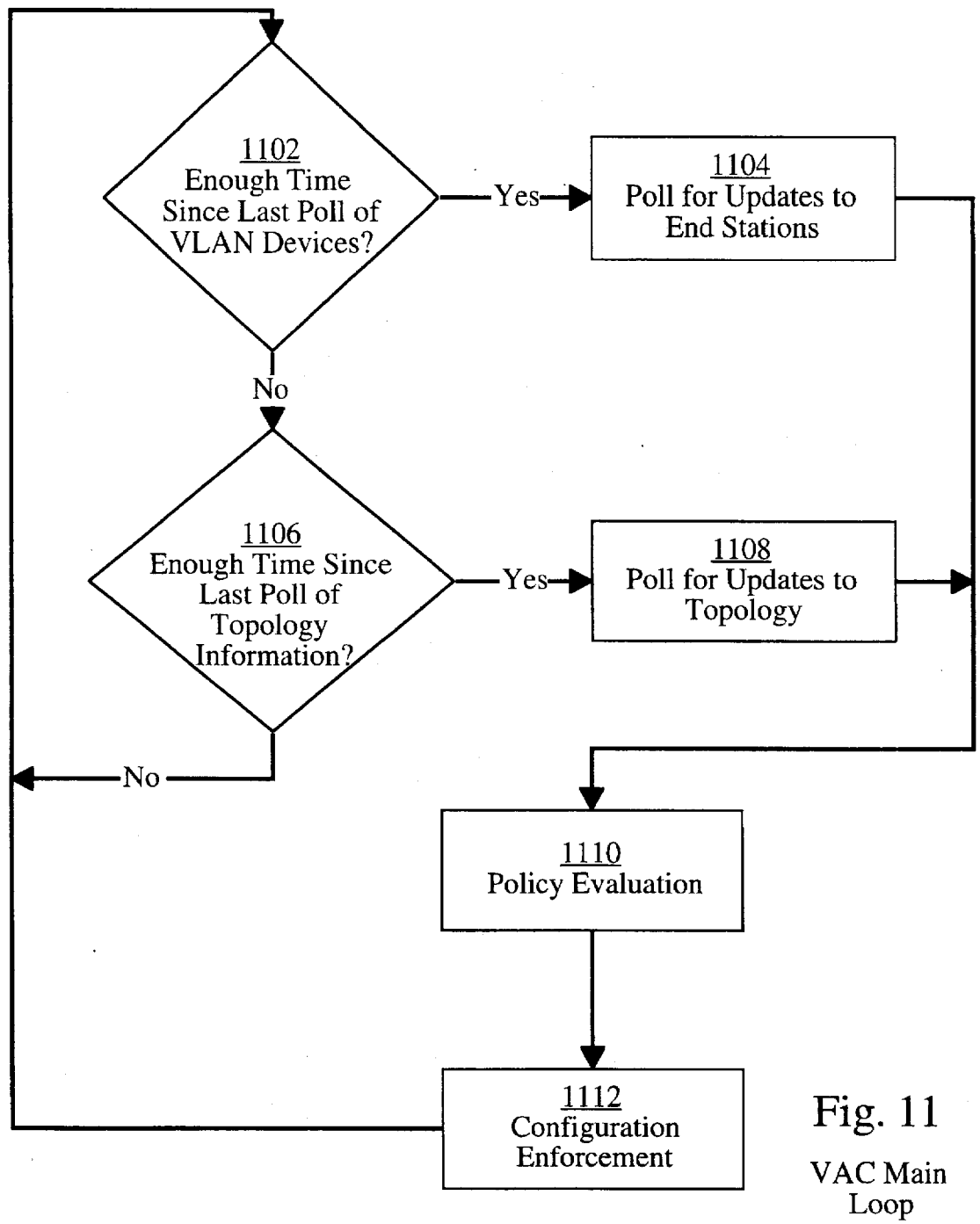
FIG. 11 shows a flowchart of the virtual auto-configuration daemon process main loop.

The flow of control in one embodiment of the VAC daemon process 331 is illustrated with reference to 1100 of FIG. 11. As illustrated in FIG. 11, VAC daemon process 331 uses polling to build and maintain a model of the network when it detects changes in connectivity, such as the addition of a new end-station. At a regular interval, the VAC daemon process polls VLAN devices to determine changes since the last poll. The polling is performed by default at 60-second intervals by default but may vary according to implementation. The value is configurable by VAC manager process 320 in implemented embodiments. The output from the polling is a list of end-stations which require reconfiguration. This list is fed into the policy evaluation module which will determine which VLAN each station belongs in. VAC daemon 331 maintains the end-stations and device connectivity information between polls in this implementation. In another implementation, traps may be used wherein VAC daemon process 331 may be notified by VLAN devices when devices become attached or disconnected. For the remainder of this application, however, the polling process will be described. In addition to the VLAN device polling, topology information is polled at regular intervals so that the VAC daemon process 331 detects changes in the physical connectivity of the network, such as the addition or removal of VLAN device(s). It may also be determined by a trap driver method as well. The default for the reading of the topology tables is an interval of 300 seconds (5 minutes) by default but may vary according to implementation. This value is also configurable by the VAC manager process 320 in implemented embodiments.

As is illustrated in 1100 of FIG. 11, it is detected at step 1102 whether enough time has transpired since the last poll of the VLAN devices. If so, VAC polling for updates to the end-stations for each VLAN device is performed at step 1104. The polling process will be described in more detail with reference to FIG. 12. Upon receipt of the updates of connectivity of end-stations in the network, policy evaluation takes place at step 1110, and configuration enforcement takes place at step 1112, for reconfiguration of the network according to evaluated policies and the end-stations matching those policies.

If, however, enough time has not transpired since the last poll of the VLAN devices as detected at step 1102, then it is determined at step 1106 whether enough time has transpired since the last poll of topology information. If so, then polling is performed at step 1108 to determine updates to the topology of VLAN devices. Updates to topology may be detected in any number of ways, including, but not limited to, by reading topology tables stored in VLAN devices. Updates of topology information may be performed in any number of ways, including manual updates by a network manager or an automatic process which detects changes to the topology. As discussed previously, automatic topology determination is especially useful because the combined process of automatic topology determination and virtual auto-configuration then becomes fully automated. In either event, when end-stations and/or VLAN devices are added, moved or removed then lists of nodes and ports are added to a change list in order to be evaluated by policy evaluation module 1110. Changes to configuration of devices in the network are then performed by configuration enforcement module 1112. Details of polling, policy evaluation and configuration enforcement will now be discussed.

Configuration Polling

Figure 12:
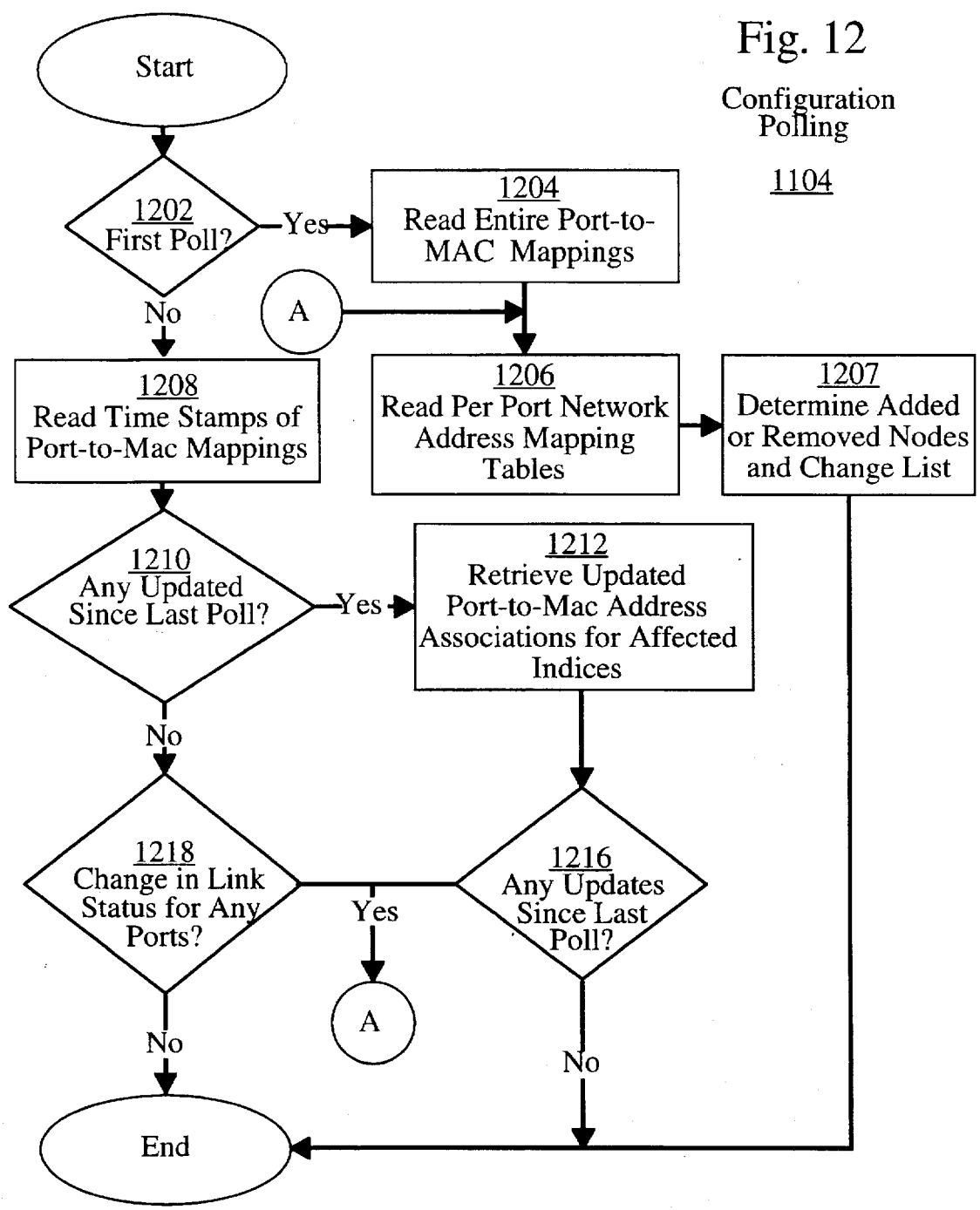
FIG. 12 shows a flowchart of the polling process which is used in implemented embodiments of the present invention.

In certain embodiments of the present invention which do not provide traps for notification of changes in the connectivity of end-stations in VLAN devices, polling must be performed by VAC daemon process 331. Process 1104 of FIG. 12 is shown primarily for polling a single type of configuration-switched device (e.g., the SynOptics 5000-series brand of concentrator), however, the process may be modified for other devices, such as frame-switched devices, cell-switched devices or configuration-switched devices available from other manufacturers. In this configuration-switched device, a plurality of tables are stored which retain port to MAC address mappings as well as time-stamps at which each of those mappings was last modified. Other mappings may be stored such as network addresses, ATM addresses, etc., depending on the type of device. Each mapping should be separately accessible by either port, index or other unique identifier for accessing either via SNMP requests or other requests from VAC daemon 331, in order to keep network traffic to a minimum. Any other mappings required for full functionality of the supported policies need to be accessible from the device(s) being polled. Policies may be defined, using any other information which may be used for identifying devices in the network.

Polling of each of the devices in the current topology is performed at regular intervals. Upon an entry into process 1104 of FIG. 12, it is determined at step 1202 whether this is the first poll of the device. If so, then all Port-to-MAC mappings are read for the device at step 1204. In addition, each per-port network address mapping table for the device is read at step 1206. Any other mapping may be obtained to support current policies. An entire list of nodes is then generated for nodes which are present on the device, allowing subsequent polling to determine updates to the previous data based on the newly polled data. Then, a list of nodes is generated which require reconfiguration, based on the polled updates (e.g., Port-to-MAC address mappings and network addresses or other information according to type of device supported, policies, etc.) at step 1207 and the process is complete. Because this is the first poll, all end-stations in the network are placed into the list and considered for evaluation.

If, however, it is not the first poll as detected at step 1202, then stored time stamps of the Port-to-MAC address mappings in the device may be read at step 1208. If any entries have been updated since the time of the last poll, as detected at step 1210, then the new Port-to-MAC address entries are retrieved according to index at step 1212, via SNMP exchanges. Based on the retrieved information, it is determined at step 1216 whether any nodes have either appeared in the network, moved or have disappeared from the network since the last poll. If no changes have occurred, then the process ends at a typical process exit point. If there have been updates since the last poll, as detected at step 1216, then process 1104 proceeds to step 1206 for retrieval of the per port network address mappings (and/or other information) and determination of added/removed end-stations at step 1207 which are then added to the change list.

Similarly, if there have been no updates to the connected nodes at step 1210 according to their time-stamp, but there have been changes in link status for any of the ports as detected at 1218, then process 1104 proceeds to step 1206. Again, if any nodes have been added, moved or removed from the network, then the per-port network address mapping tables are read at step 1206. Once this has been done, the process can determine added, moved or removed nodes and add then nodes to the change list. The change list is then passed to policy evaluation module 404 which will be described below.

Although certain nodes may disappear from the network for periods of time, they are not immediately indicated as having been removed from the network at step 1207, since those nodes may reappear on the network at certain specified times after they disappear from the network. In certain circumstances (e.g., at the end of the business day), certain nodes may be powered-down in the system and immediately disappear from the network. If the end-station is entirely removed from the VLAN, then it will have to be added back into the VLAN once it reappears in the network (e.g., at the beginning of the next business day). If a significant number of nodes are powered down at certain times and reactivated at certain other times substantial network traffic and, in turn, substantial reconfiguration of the network would occur. Thus, in this embodiment of the present invention, step 1207 includes a time-out process wherein nodes will only be indicated as deleted from given VLANs if and only if they have been removed for some specified period of time (e.g., 12 hours), or if they appear at a second position in the network. In the instance of an end-station disappearing and reappearing at a second position in the network, an override of the time-out will occur and the station will immediately be indicated as removed from a first VLAN device, and then added to a second VLAN device.

Process 1104 of FIG. 12 is primarily shown for a configuration-switched device such as a concentrator or hub. For other devices, such as those using frame-switched or cell-switched technologies, certain tables may be queried from the devices in order to determine whether end-station connectivity has changed. Port-to-MAC Address mappings of each device may be read at each polling interval in frame-switched devices. On a first poll, as in the configuration-switched devices, all nodes will be considered for reconfiguration, but on subsequent polls, only changes such as additions, moves or removals are considered. For cell-switched devices, new stations can be detected by reading the tables containing the mappings. As in the two previous cases, on a first poll, all nodes are considered for evaluation, but on subsequent polls, only additions or removals are considered.

Connectivity Traps

In an alternative embodiment, as already discussed, instead of polling, agent traps can be used in order to decrease the amount of network traffic generated by VLAN devices 410, and increase the performance of the VAC daemon process 331. That is, device agents within each of the VLAN devices in the network fabric could generate traps via SNMP information exchanges with VAC daemon process 331 when changes in link status of any ports or changes of connectivity of end-stations occur in the VLAN device. With changes to the Port-to-MAC address mappings, update traps would indicate that a new end-station has been detected and added or an entry has been removed. A link status trap may also be generated by this type of device, and the operation would be similar to that as in the polling process discussed above. If the link status indicates that the link has become active, then the VAC daemon process 331 would read the Port-to-MAC address mappings and network address mapping table entry (or other stored information) for the port for which the link has been indicated by the trap, and would be used for evaluation by policy evaluation module 404.

Policy Evaluation

Figure 13:
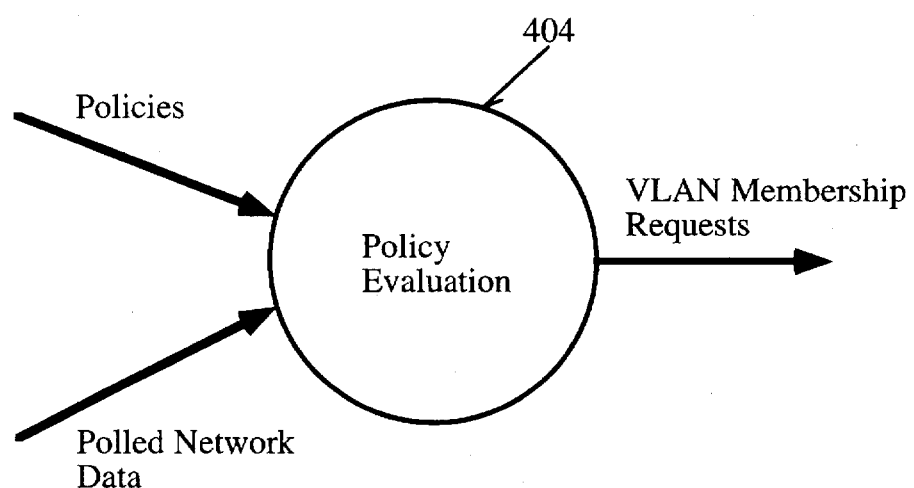
FIG. 13 shows the interrelationship of the policy evaluation module with the policies and polled network data which is obtained in implemented embodiments of the present invention.
Figure 14:
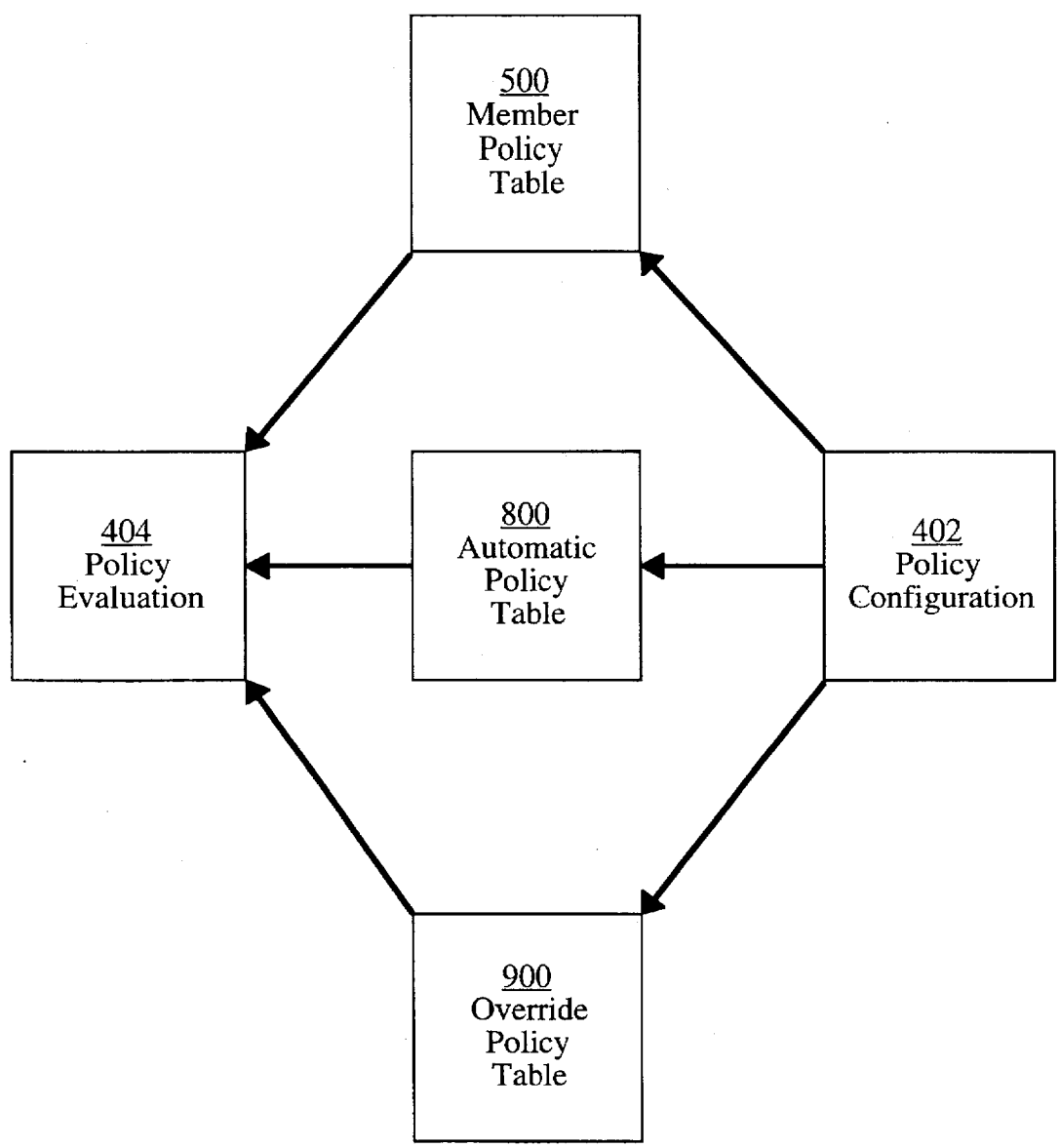
FIG. 14 shows the relationship between the policy evaluation module and the various policy tables which are maintained in implemented embodiments of the present invention.

A second component of VAC daemon process 331 is policy evaluation module 404. Policy evaluation module 404 receives any policies which have been stored during configuration in the policy tables discussed above and the polled network data generated by the configuration poller 403. Policy evaluation module 404 evaluates the end-stations which poller 403 has determined require evaluation against the policies. Policy evaluation module 404 generates high level commands which are issued to the configuration enforcement module 405 which indicates which end-stations need to be added or deleted to which VLANs. This is illustrated in FIG. 13. As illustrated with reference to FIG. 14, policy configuration process 402 generates the three policy tables 500, 800 and 900 which are evaluated by policy evaluation module 404 to generate the high-level commands.

Figure 15A:
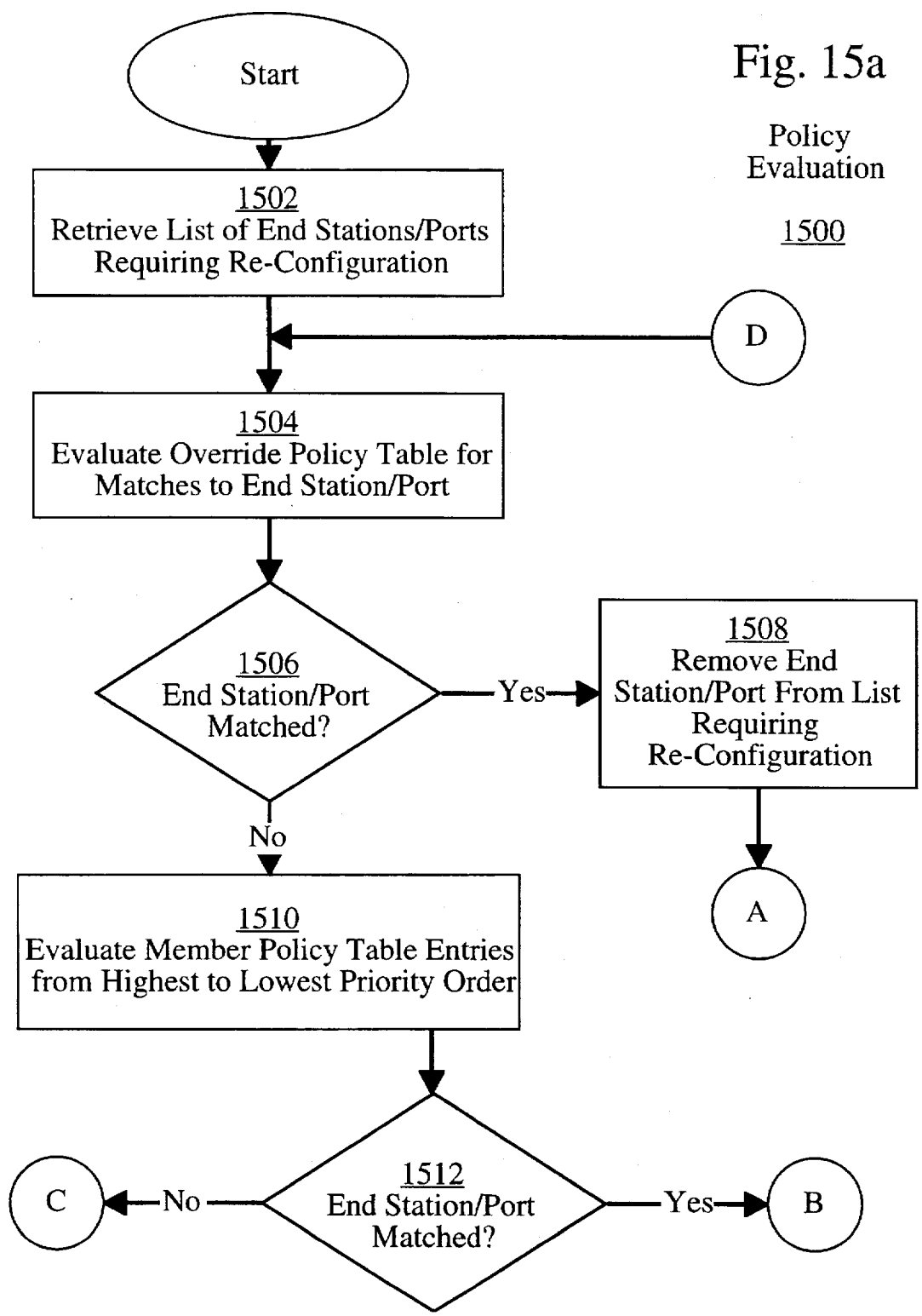

FIGS. 15a and 15b shows one implementation of a policy evaluation process 1500. Upon commencement of process 1500, the list of end-stations and ports requiring reconfiguration is received (e.g., from poller 403) at step 1502. First, using the list of end-station(s)/port(s) indicated as requiring reconfiguration, override policy table 900 is evaluated for matches. If there is a match to any of the override policies, as detected at step 1506, then the end-station or port is removed from the list of nodes requiring reconfiguration at step 1508. In other words, no reconfiguration requests are generated. If, however, none of the override policies have been matched as detected at step 1506, then the member policy table entries are evaluated with reference to the end-station/port from highest priority to lowest priority order at step 1510 according to the priority field in each of the policy entries (e.g., 507 of 500). Then, if there are any matching policies for the end-station or port as detected at step 1512, high-level configuration requests are generated based upon the matched member policy at step 1514 in FIG. 15b. For example, if an end-station matches a policy for a VLAN which currently does not exist, then a CREATE_VLAN request is sent to policy configuration enforcement module 405 for a specified device. If, however, the VLAN already exists, then a configuration request ADD_MEMBER can be sent to configuration enforcement module 405. In either event, these high level configuration requests will be broken down into component SNMP requests by configuration enforcement module 405 for transmission to the various VLAN devices in the switched network.

If an end-station or port is removed from the network then, depending on current conditions (e.g., whether current tables specifying VLAN membership indicate that it is the last remaining device in a VLAN, or is only a single end-station which is removed from a VLAN), a configuration request either removes the end-station from the identified VLAN or otherwise reconfigures the appropriate VLAN device(s). A summary of the high level configuration requests which may be sent by policy evaluation module 404 are illustrated below with reference to table 1:

TABLE 1

| Primitive Function | Primitive Attributes |
|---|---|
| Create_VLAN - the VAC will be able to create the VLANs [definition] automatically, without any user intervention. The VLAN_id and VLAN_name may be entered by the human network manager or generated by the VAC. | VLAN_id (globally unique) VLAN_name (ASCII) |
| Remove_VLAN - the VAC will be able to remove a VLAN definition that it has created. A VLAN with one or more members must be de-associated first, either automatically or by the human network manager. | VLAN_id |
| Add_member - the VAC will be able to automatically add members to the VLAN_member_list of an existing VLAN based on the VLAN_policy_list. | VLAN_member_identifier |

TABLE 1-continued

| Primitive Function | Primitive Attributes |
| --- | --- |
| Delete_member - the VAC will be able to delete a member from the VLAN_member_list of an existing VLAN based on the VLAN_policy_list. | VLAN_member_identifier |

Once configuration requests are generated, process 1500 proceeds to step 1524 to determine whether any more end-stations or ports are in the list received from the configuration poller. If not, then process 1500 ends at a typical process exit point.

If the end-station or port has not been matched with any policies from the member policy table entries as detected at step 1512, then process 1500 proceeds to step 1516 in FIG. 15b. In this case, automatic policies are evaluated with reference to the end-station/port. Automatic policies are specified in the automatic policy table such as 900 of FIG. 9 discussed above. If any of the automatic policies match as detected at step 1518, then, step 1520 is performed wherein configuration requests are generated based upon the matched policies. Then, process 1500 proceeds to step 1524 to determine whether any more end-stations/ports are in the configuration list. If not, the process is complete.

Finally, if none of the three policy tables contain any matches to the current end-station/port in the list being examined, then some default action (e.g., partitioning or isolation of the port) is performed at step 1522. This depends upon certain default actions specified by the network manager. In the case of partitioning a port in a configuration-switched device, operation from the port is deactivated. For isolation of a port, it will not be deactivated, however, it is isolated from the remainder of the network. Another default action which may occur is no reconfiguration of VLAN devices for the end-station. This option is the least secure, allowing the end-station to remain in a VLAN to which it was originally assigned. Step 1522 then proceeds to step 1524 to determine whether any more end-stations/ports are in the reconfiguration list, and if not, the process is complete. Thus, upon completely examining all end-stations/ports in the policy configuration list received from configuration poller 403, policy evaluation module 404 is thus complete.

Configuration Enforcement

Figure 16:
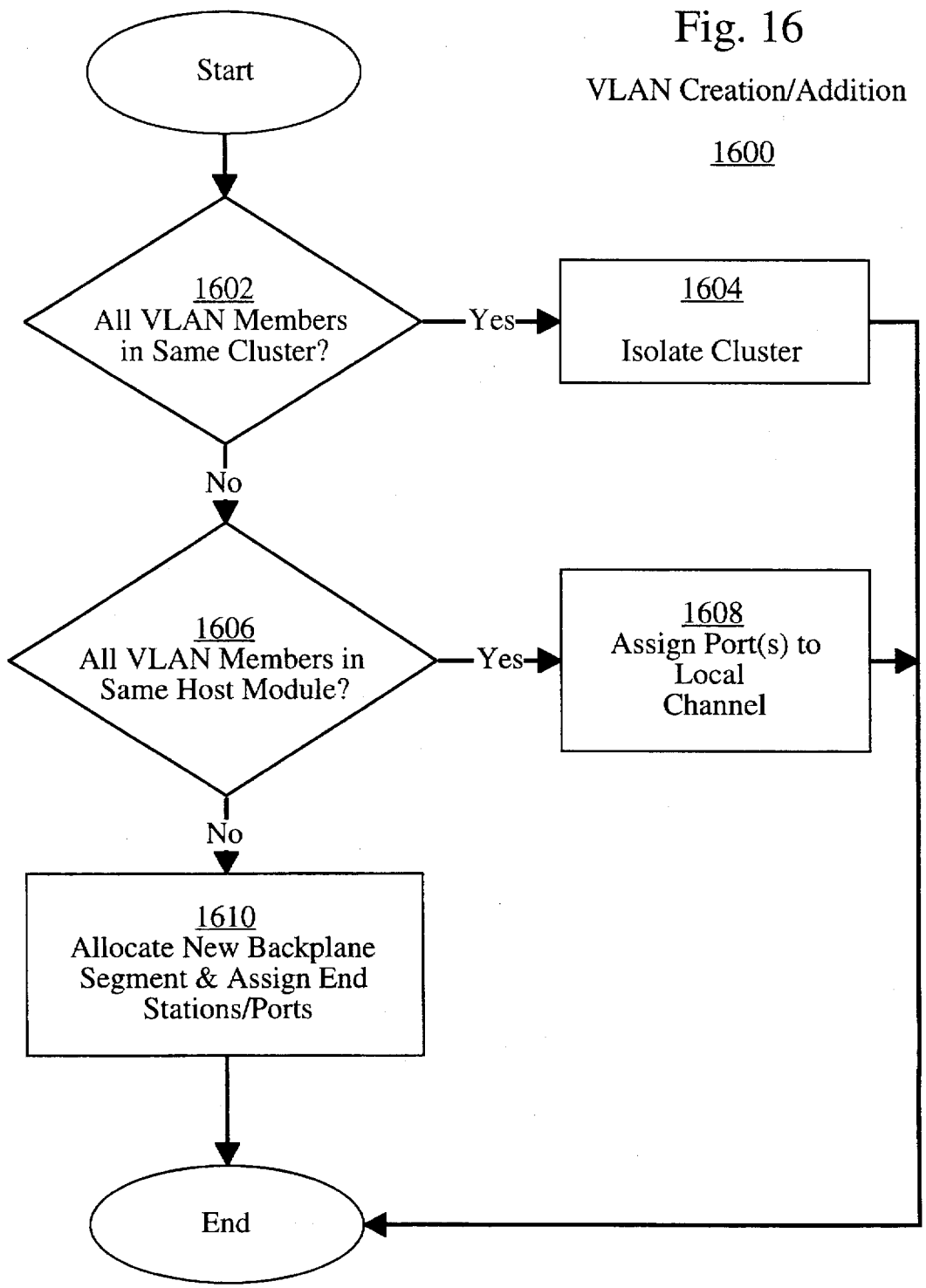
FIG. 16 shows a flowchart of the virtual local area network creation/addition process in a single hub.

The last component of VAC process 331 is configuration of VLAN devices in the network. This is performed by configuration enforcement module 405. Configuration enforcement module 405 receives the high level configuration requests from policy evaluation module 404, as discussed above, or from the VAC manager process 320 via SNMP requests. As discussed previously, the high level request consists of primitives which specify the creation of a VLAN, the deletion of a VLAN, the addition of a VLAN member or the removal of a VLAN member. During all operations, configuration enforcement module 405 seeks to create the smallest, most efficient VLAN for the added end-station/port. Process 1600 of FIG. 16 shows how resources are utilized within a configuration-switched device, using the SynOptics System 5000 brand concentrator as an example. In this device, if all the end-stations or ports (belonging in a single VLAN) are in the same cluster as detected at step 1602, then the cluster is isolated and used to connect the end-stations or ports at step 1604. If they are in the same host module as detected at step 1606, then a local channel may be used to support the VLAN at step 1608. If, however, neither of these conditions is present, then a new backplane segment is allocated for the new VLAN at step 1610, and the appropriate ports are switched to the backplane. The process for VLAN creation on the hub is thus complete. Any other optimizations of such a creation of a VLAN in a configuration-switched device may be performed according to the particular type of device being configured. For cell-switched and frame-switched VLAN devices, VLANs may be created by adding the VLAN to tables contained in the devices via SNMP requests and adding members using a unique identifier assigned to that VLAN.

Figure 17:
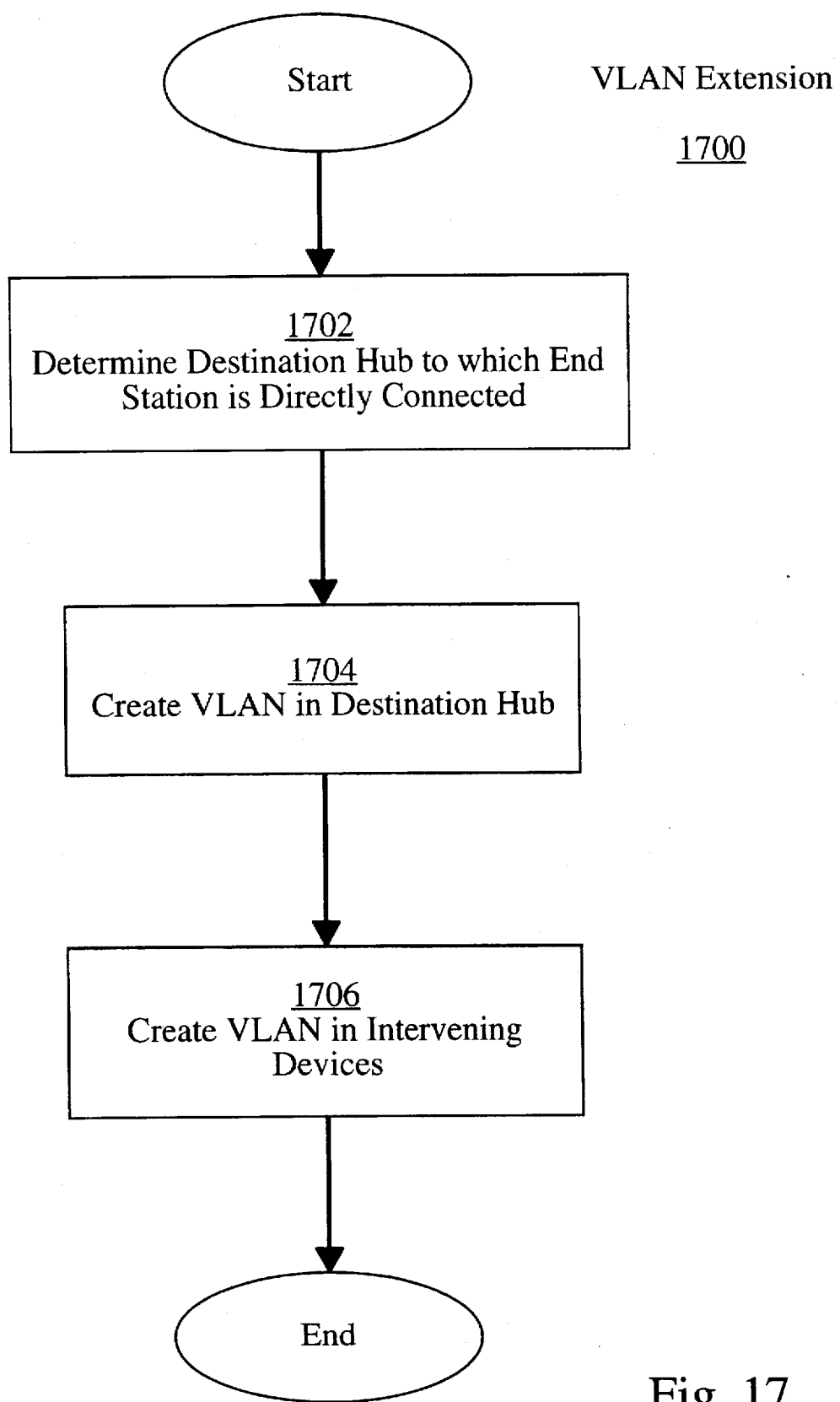
FIG. 17 shows a VLAN extension process which is performed in a networking system.

In the case of an extension of an existing VLAN, the VLAN is created in the local community, at step 1704 in FIG. 17. A path between the new devices and other devices or communities having the same VLAN is then generated via SNMP requests to each of the intervening devices via VLAN creation in each device at step 1706. This VLAN extension is illustrated with reference to process 1700 of FIG. 17.

To optimize use of the network, VLANs may also be contracted, upon detection that certain end-stations or ports are no longer connected to the VLAN. Thus, for each community, upon removal of an end-station from the community it can be determined whether the VLAN may be further contracted. This may include deletion of the VLAN from the community and possibly from intervening devices wherein the VLAN no longer needs to span the same devices and communities. In another example, an end-station which was not connected to the same cluster or host module may be removed, resulting in the use of a local channel or an isolated cluster, and the release of the currently used backplane. Other optimizations may occur, according to device and/or technologies. VLAN expansion/contraction is implementation-dependent, depending on the particular device(s) involved. An example of VLAN contraction is shown in FIG. 18.

Figure 18:
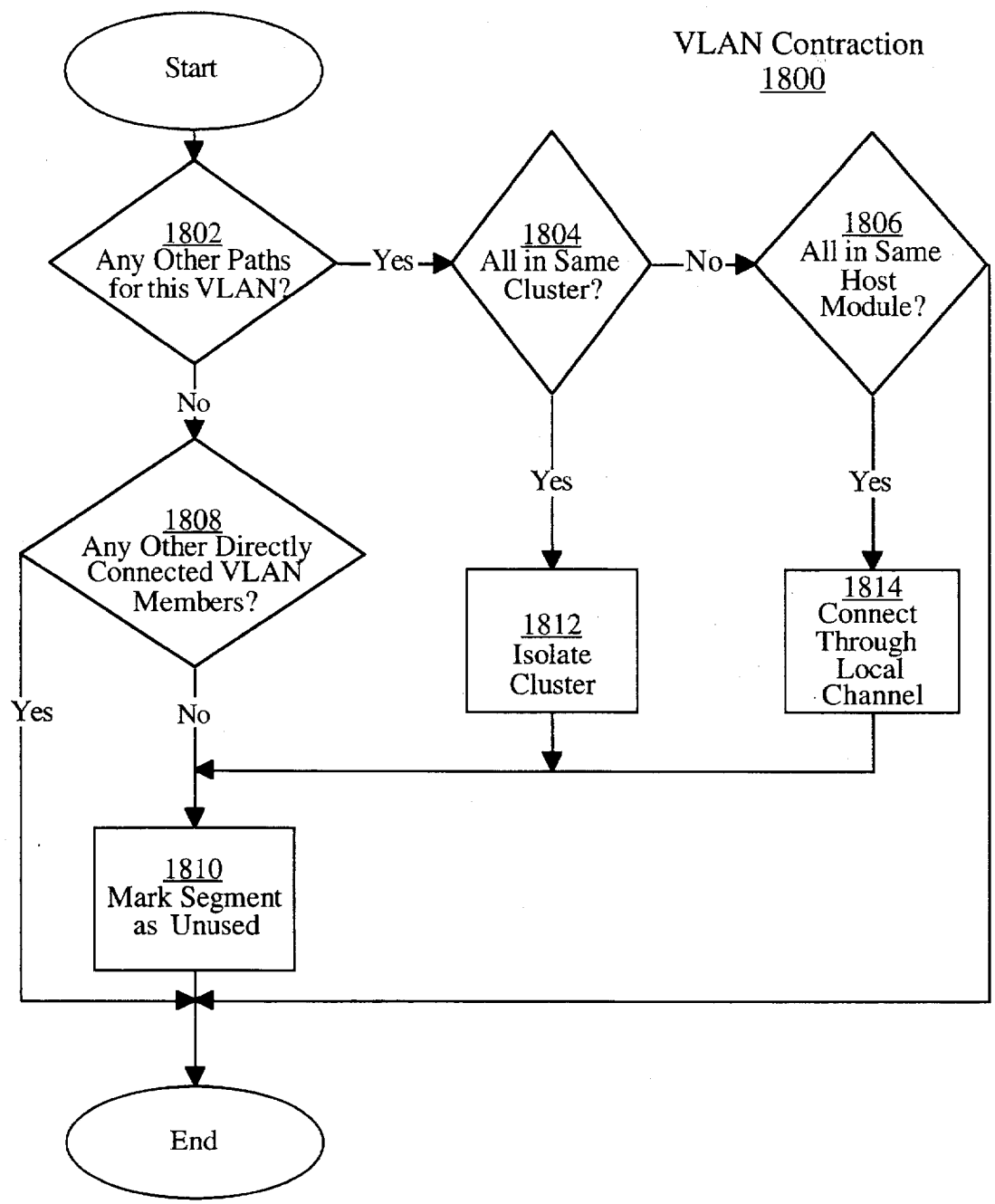
FIG. 18 shows a VLAN contraction process used in implemented embodiments of the present invention.

VLAN contraction for a configuration-switched device may be performed by a process such as 1800 shown in FIG. 18. Upon entry into process 1800, it is first determined whether there are any other paths by which the VLAN is connected in the device at step 1802. If so, the VLAN cannot be contracted any more, and the process exits (e.g., at a typical process exit point). If there are no other paths for the VLAN, then it is determined at step 1808 whether there are any other directly connected VLAN members (not interconnect ports) which are present in the community under examination. If so, and they are all in the same cluster as detected at step 1804, then the cluster may be isolated at step 1812, and the backplane segment marked as unused at step 1810. Then, the process is complete. If, however, there are no other directly connected VLANs as detected at step 1808, then the segment is marked as unused and the process is complete. If they are not in the same cluster as determined at step 1804 but are in the same host module as detected at step 1806, then a local channel may be used at step 1814 to further provide a communication path in the community. And, the segment may be marked as unused, and freed for use at step 1810. Then, the process is complete. If they are not in the same host module as detected at step 1806, then no further contraction may be performed, and the process is complete. Thus, VLAN contraction may be performed within a configuration device. In other devices, according to implementation, other methods may be used to optimize resources.

Finally, the last two processes which may be performed in a community are the addition or deletion of a VLAN member. For cell-switched or frame-switched devices, the members need only be added or deleted to/from tables within the device in the community as required, in implemented embodiments, via SNMP exchanges between VAC daemon 331 and VLAN device 410. In configuration-switched devices, the member is added to the VLAN by switching the port to which the station is connected to the local channel or backplane segment allocated for the VLAN. Similarly, when a VLAN member is deleted from a configuration-switched device, the port is merely switched back to a default management backplane.

Figure 19:
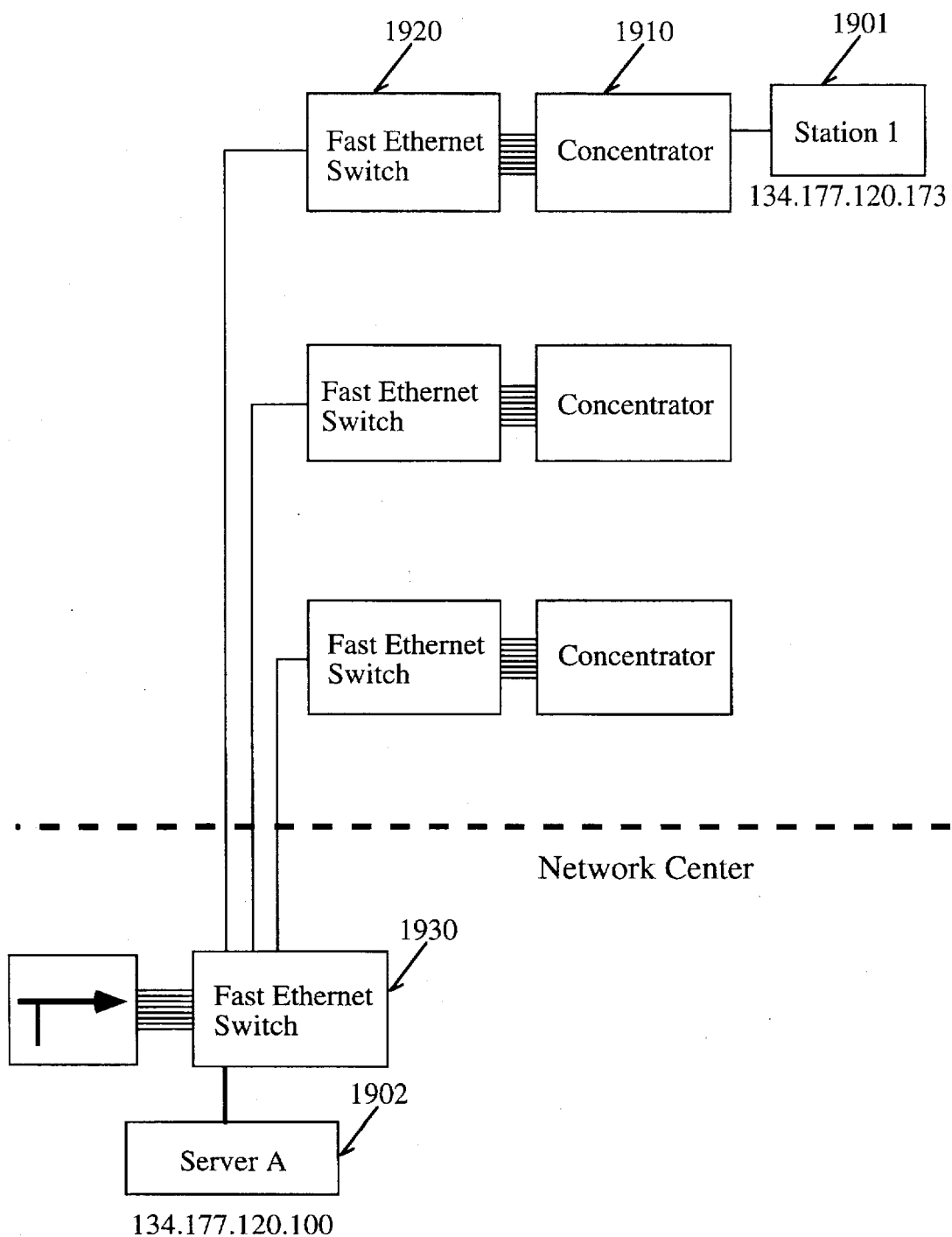
FIG. 19 shows an example of adding a new end-station to an inter-networking system.
Figure 20:
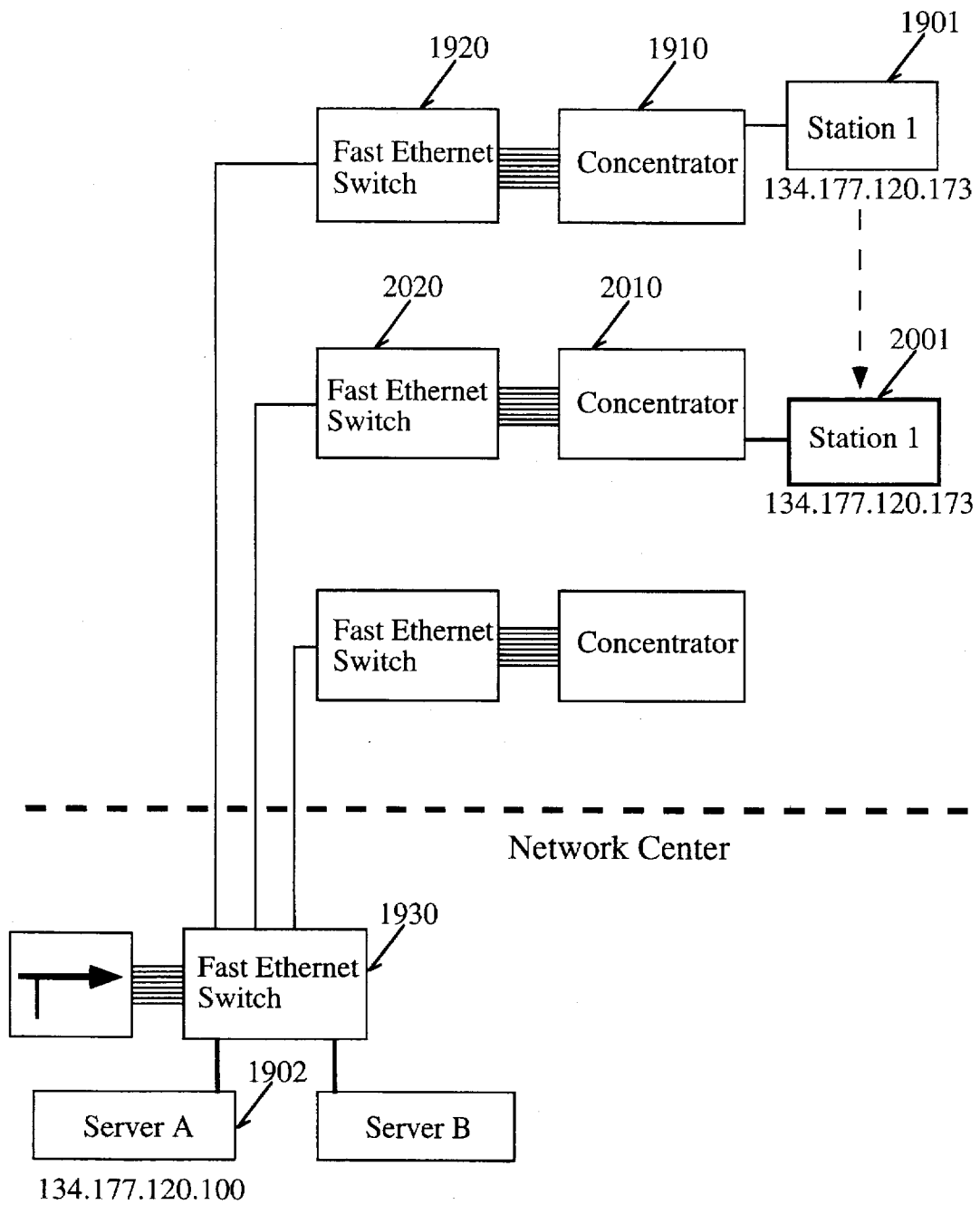
FIG. 20 shows an example of moving an end-station in an inter-networking system.

Two brief examples of adding an end-station and moving an end-station within a network are shown with reference to FIGS. 19 and 20. For example, as illustrated in FIG. 19, a new station 1901 may have a matching policy for connection to a server 1902 in the switched fabric through an established policy. In this instance, the new station 1901 will be determined to have the same IP subnet association with the server and a configuration request for adding the new end-station 1901 to the VLAN of which 1902 is a member. In this event, assuming that the VLAN does not already exist on the concentrator 1910, a VLAN is created for the new end-station according to its port in concentrator 1910. This is done by creating a new segment using a backplane in the device. Then, the intervening device, 1920 is reconfigured to create the VLAN to provide a communication path from server 1902 to station 1901. This is accomplished by adding an entry to the device's internally-stored VLAN table via SNMP requests. A similar configuration request is performed in device 1930. A communication path is then established as a VLAN between server 1902 and end-station 1901. Thus, auto-configuration of the added end-station 1901 is thus complete.

As a second example, assume that the end-station 1901 is moved to reside at a new position 2001 as illustrated in FIG. 20. This is an example of the "auto-roaming" feature. In this example, the end-station at the new position 2001, and the removal from 1901 will be detected by the poller 403. The policy evaluator 404 will detect that the station should be associated at its new position with server 1902. Thus, the devices 1930, 1920 and 1910 will all be reconfigured to remove station 1 from its former location 1901, and devices 1930, 2020 and 2010 will be reconfigured to place the station 2001 at its new location. This, again, will be done in the manner as discussed above via configuration enforcement module 405 performing the necessary SNMP requests to all of devices 1910, 1920, 1930, 2010 and 2020. Thus, the user at station 1, now residing at location 2001, will have all network services previously provided to him such as those provided by server 1902 shown in FIG. 20 as a full communication path has now been re-established.

Thus, a mechanism for automatic configuration of virtual networks has been described especially for those networks implementing cross-technology connectivity (e.g., those combining frame-switched, cell-switched and/or configuration-switched devices). Although the present invention has been described particularly with reference to very specific embodiments, especially reference by FIGS. 1–20, it can be appreciated by one skilled in the art that various modifications may be made by one skilled in the art without departing from the overall spirit and scope of the present invention. Thus, the present invention is only to be construed as limited by the appended claims which follow.

What is claimed is:

1. A physical networking system including a plurality of end-stations said physical networking system comprising:

a. at least one switching device adapted to support a virtual network;

b. at least one end-station interconnected with said at least one switching device, wherein said at least one switching device and said end-station are interconnected in a first topology; and c. a configuration device, said configuration device including:

i. a configuration modification detection circuit to detect the modification of said first topology;

ii. a configuration policy maintenance circuit to store a policy defining said virtual network as including a logical sub-group of said plurality of end stations according to a predetermined logical criteria iii. a policy evaluation circuit to determine a manner in which to reconfigure said at least one switching device to implement said virtual network upon said detection of said modification of said first topology, said manner being determined in accordance with said policy; and iv. a reconfiguration circuit automatically to reconfigure said at least one switching device in said manner.

2. The networking system of claim 1 wherein said reconfiguration includes coupling said at least one end-station in said networking system to form said virtual network according to said policy.

3. The networking system of claim 1 wherein said reconfiguring includes determining an efficient manner in which to reconfigure said at least one switching device to form said virtual network.

4. The networking system of claim 1 wherein said reconfiguring further includes reconfiguring said at least one switching device to remove said virtual network when said virtual network is no longer required.

5. The networking system of claim 1 wherein said reconfiguring further includes reconfiguring said at least one switching device to interconnect said at least one end-station and said at least one switching device so as to include said at least one end-station to said virtual network.

6. The networking system of claim 1 wherein said configuration modification detection circuit comprises a polling circuit to poll at least one automatic topology determination circuit to detect said modification of said first topology.

7. The networking system of claim 1 wherein said configuration modification detection circuit comprises a trap reception circuit to receive traps generated by at least one automatic topology determination circuit upon said modification of said first topology.

8. The networking system of claim 1 wherein said configuration modification detection circuit comprises a polling circuit to poll said at least one switching device to detect said modification of said first topology.

9. The networking system of claim 1 wherein said configuration modification detection circuit comprises a trap reception circuit to receive traps generated by said at least one switching device upon said modification of said first topology.

10. The networking system of claim 1 wherein said policy includes a member policy table identifying said at least one end-station as forming part of said virtual network.

11. The networking system of claim 1 wherein said policy includes an override policy table specifying that said at least one switching device should not be reconfigured upon said modification of said first topology.

12. The networking system of claim 1 wherein said policy includes an automatic policy table specifying automatic configuration of said at least one switching device to implement said virtual network, wherein said virtual network is characterized by a predetermined attribute of said at least one end-station.

13. The networking system of claim 1 wherein said policy identifies hardware addresses to be coupled to form said virtual network.

14. The networking system of claim 1 wherein said policy identifies ports on said at least one switching device which form said virtual network.

15. The networking system of claim 1 wherein said policy identifies asynchronous transfer mode (ATM) addresses to be coupled to form said virtual network.

16. The networking system of claim 1 wherein said policy identifies network layer addresses to be coupled to form said virtual network.

17. The networking system of claim 16 wherein said network layer addresses include internet protocol (IP) addresses.

18. The networking system of claim 1 wherein said policy specifies multiple instances of specified attributes to be coupled to form said virtual network.

19. An automatic method in a configuration device in a physical networking system having at least one switching device adapted to implement a virtual network within said physical networking system, and at least one end-station interconnected with said at least one switching device, wherein said at least one switching device and said at least one end-station are interconnected in a first topology, and said virtual network comprises a logical grouping of end-stations within said physical networking system, said automatic method comprising the steps of:

a. storing a policy defining said virtual network upon modification of said first topology, according to a predetermined logical criteria, as including said logical grouping of end-stations within said physical networking system;

b. detecting said modification of said first topology;

c. determining a manner in which to reconfigure said at least one switching device to implement said virtual network upon said detection of said modification of said first topology, said manner being determined in accordance with said policy; and d. automatically reconfiguring said at least one switching device in said manner.

20. A method for managing a virtual network in a switched, physical networking system comprising at least one end-station, a switching device and a configuration device, wherein said virtual network comprises a logical, sub-grouping of end-stations within said physical network defined according to a predetermined logical criteria, said method of managing said virtual network comprising the following steps:

a. said configuration device communicating with said switching device to determine changes of connectivity of at least one end-station and said switching device in said switched networking system;

b. said configuration device referencing a policy for management of said virtual network in said switched networking system in order to determine reconfiguration of said switching device for said management of said virtual network;

c. said configuration device determining said reconfiguration of said switching device; and d. said configuration device automatically performing said reconfiguration of said switching device for said management of said virtual network.

21. The method of claim 20 wherein said managing includes creating said virtual network.

22. The method of claim 20 wherein said managing includes deleting said virtual network.

23. The method of claim 20 wherein said managing includes maintaining said virtual network.

24. The method of claim 20 wherein said managing includes creating, deleting and maintaining said virtual network.

25. The method of claim 20 wherein said managing includes creating, deleting and maintaining said virtual network in order to create an efficient communication path among said virtual network and another virtual network.

26. Network management apparatus for use in a physical networking system, said physical networking system having at least one switching device capable of implementing a virtual network and at least one end-station interconnectable with said switching device, wherein said at least one switching device and said at least one end-station are interconnected in a first topology, and wherein said virtual network comprises a sub-group of end-stations of said physical networking system allocated to a virtual network grouping according to a predetermined logical criteria, said network management apparatus comprising:

a. a configuration modification detection circuit to detect the modification of said first topology;

b. a policy evaluation circuit to identify said at least one end-station as being allocated to said virtual network grouping utilizing a policy upon said detection of said modification of said first topology; and c. a reconfiguration circuit automatically to reconfigure said switching device to implement said virtual network grouping of said at least one end-station.

27. The apparatus of claim 26 further comprising a configuration policy maintenance circuit to store said policy for determining said virtual network grouping of said at least one end-station.

28. The apparatus of claim 26 wherein said configuration modification detection circuit comprises a polling circuit to poll at least one automatic topology determination circuit in said networking system to detect said modification of said first topology.

29. The apparatus of claim 26 wherein said configuration modification detection circuit comprises a trap reception to receive traps generated by at least one automatic topology determination circuit in said networking system upon said modification of said first topology.

30. The apparatus of claim 26 wherein said configuration modification detection circuit comprises a polling circuit to poll said at least one switching device in said networking system to detect said modification of said first topology.

31. The apparatus of claim 26 wherein said configuration modification detection circuit comprises a trap reception circuit to receive traps generated by said switching device in said networking system upon said modification of said first topology.

32. The apparatus of claim 31 wherein said configuration modification detection circuit generates a list of end-stations requiring evaluation.

33. The apparatus of claim 32 wherein said policy evaluation circuit matches said list of end-stations requiring evaluation with said policy in order to determine said virtual network grouping.

34. The apparatus of claim 33 wherein said reconfiguration circuit determines said reconfiguring of said at least one switching device according to said virtual network grouping of said at least one end-station.

35. The apparatus of claim 26 wherein said policy includes a member policy table identifying said at least one end-station as forming part of said virtual network.

36. The apparatus of claim 26 wherein said policy includes an override policy table specifying that said at least one switching device should not be reconfigured upon said modification of said first topology.

37. The apparatus of claim 26 wherein said policy includes an automatic policy table specifying automatic creation of said virtual network based on a predetermined attribute of said at least one end-station.

38. The apparatus of claim 26 wherein said policy identifies hardware addresses to be coupled to form said virtual network.

39. The apparatus of claim 26 wherein said policy identifies ports on said at least one switching device which form said virtual network.

40. The apparatus of claim 26 wherein said policy identifies asynchronous transfer mode (ATM) addresses to be coupled to form said virtual network.

41. The apparatus of claim 26 wherein said policy identifies network layer addresses to be coupled to form said virtual network.

42. The apparatus of claim 41 wherein said network layer addresses include internet protocol (IP) addresses.

43. The apparatus of claim 26 wherein said policy includes a specification of multiple instances of specified attributes to be coupled to form said virtual network.

44. Network management apparatus in a networking system including a plurality of end-stations, said networking system having at least one switching device capable of supporting a virtual network and at least one end-station interconnected with said at least one switching device, wherein said at least one switching device and said at least one end-station are interconnected in a first topology, and wherein said virtual network comprises a logical sub-grouping of end stations defined according to a predetermined logical criteria, said network management apparatus comprising:

a. a configuration policy maintenance circuit for storing a policy defining said virtual network and allocating said at least one end-station to said virtual network according to said predetermined logical criteria;

b. a configuration modification detection circuit for detecting modification of said first topology;

c. a policy evaluation circuit for determining said allocation of said at least one end-station to said virtual network, by referencing said policy stored in said configuration policy maintenance circuit, upon said detection of said modification of said first topology; and d. a reconfiguration circuit for automatically reconfiguring said at least one switching device upon said detection of said modification of said first topology to implement said virtual network.

45. An automatic method for configuration of a networking system having at least one switching device capable of supporting a virtual network and at least one end-station interconnectable with said at least one switching device, wherein said at least one switching device and at least one end-station are interconnected in a first topology, and wherein said virtual network comprises a plurality of end-stations allocated to a logical grouping defined according to a predetermined logical criteria, said method comprising the following steps:

storing a policy defining said logical grouping of said end-stations according to said predetermined logical criteria;

detecting modification of said first topology;

upon detection of said modification, determining said logical grouping of said at least one end-station to form said virtual network according to said policy; and upon said detection of said modification, automatically reconfiguring said at least one switching device in said network to support said logical grouping of said at least one end-station.

46. The method of claim 45 wherein said configuration modification detection comprises polling at least one topology determination circuit in said network to determine said modification of said first topology.

47. The method of claim 45 wherein said configuration modification detection comprises receiving traps generated by said at least one topology determination circuit in said network upon said modification of said first topology.

48. The method of claim 45 wherein said configuration modification detection comprises polling said at least one switching device in said network to determine said modification of said first topology.

49. The method of claim 45 wherein said configuration modification detection comprises receiving traps generated by said at least one switching device in said network upon said modification of said first topology.

50. The method of claim 49 wherein said configuration modification detection generates a list of end-stations requiring evaluation.

51. The method of claim 50 wherein said policy evaluation matches said list of end-stations requiring evaluation with said policy in order to determine said logical grouping.

52. The method of claim 51 wherein said reconfiguration circuit determines said reconfiguring of said at least one switching device according to said logical grouping of said at least one end-station.

53. The method of claim 45 wherein said policy includes a member policy table identifying said at least one end-station as forming part of said virtual network.

54. The method of claim 45 wherein said policy includes an override policy table specifying that said at least one switching device should not be reconfigured upon said modification of said first topology.

55. The method of claim 45 wherein said policy includes an automatic policy table specifying automatic creation of said virtual network based on a predetermined attribute of said at least one end-station.

56. The method of claim 45 wherein said policy identifies hardware addresses to be coupled to form said virtual network.

57. The method of claim 45 wherein said policy identifies ports on said at least one switching device which form said virtual network.

58. The method of claim 45 wherein said policy identifies asynchronous transfer mode (ATM) addresses to be coupled to form said virtual network.

59. The method of claim 45 wherein said policy identifies network layer addresses to be coupled to form said virtual network.

60. The method of claim 59 wherein said network layer addresses include internet protocol (IP) addresses.

61. The method of claim 45 wherein said policy includes a specification of multiple instances of specified attributes of said at least one end station be coupled to form said virtual network.

\* \* \* \* \*